US006305769B1

(12) United States Patent
Thayer et al.

(10) Patent No.: US 6,305,769 B1
(45) Date of Patent: *Oct. 23, 2001

(54) SELECTIVE DEPOSITION MODELING SYSTEM AND METHOD

(75) Inventors: Jeffrey S. Thayer, Nahant, MA (US); Thomas A. Almquist, San Gabriel, CA (US); Christian M. Merot, Saugus, CA (US); Bryan J. L. Bedal, Palmdale, CA (US); Richard N. Leyden, Topanga Canyon, CA (US); Keith Denison, Valencia, CA (US); John S. Stockwell, Sylmar, CA (US); Anthony L. Caruso, Northridge, CA (US); Michael S. Lockard, Valencia, CA (US)

(73) Assignee: 3D Systems, Inc., Valencia, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,001

(22) Filed: Jun. 13, 1997

Related U.S. Application Data

(63) Continuation of application No. 08/534,477, filed on Sep. 27, 1995, now abandoned.

(51) Int. Cl.[7] ........................................................ B41J 2/01
(52) U.S. Cl. .................................................................... 347/1
(58) Field of Search ................... 347/1, 37; 364/468.26; 156/58; 427/466; 264/308, 401

(56) References Cited

U.S. PATENT DOCUMENTS 2,775,758   12/1956   Munz ................................... 342/179
3,083,880   4/1963   Weisz ................................... 222/146
3,560,641 * 2/1971   Taylor et al. ........................ 358/296

(List continued on next page.)

FOREIGN PATENT DOCUMENTS 1298689   4/1992   (CA) .
250121   12/1987   (EP) .
322257   6/1989   (EP) .

(List continued on next page.)

OTHER PUBLICATIONS

Hawlkeys Condensed Chemical Dictionary, Richard J. Lewis, Sr., pp. 1173–1174, 1997.*
Wohlers, T., *Cadence*, Plastic Models in Minutes, p. 101–104 (Jul. 1990), US.
*Production*, No–Mess Modeling in Minutes, p. 16 (Aug. 1990), US.
Herbert, A. J. *Journal of Applied Photograpic Engineering*, Solid Object Generation, vol. 8, No. 4, pp. 185–188 (Dec., 1981), US.
*Flexible Automation*, Stratysys Makes 3D Models in Minutes, pp. 6–7 (Jul. 1990), US.
Kodama, H. *Review of Scientific Instruments*, Automated Method for Fabricating a Three–Dimensional Plastic Model with Photohardening Polymer, vol. 52, No. 11, pp. 1770–1773 (Nov. 1981), US.

Primary Examiner—David F. Yockey
Assistant Examiner—Michael S Brooke
(74) Attorney, Agent, or Firm—Ralph D'Alessandro

(57) ABSTRACT

A system and associated method for forming three-dimensional objects under computer control and from a material which may be rendered flowable and then dispensed on a layer-by-layer basis. The layers of the material solidify or otherwise physically transform upon being dispensed thereby forming successive cross-sections. The dispensing process is repeated whereby successive layers adhere to each other thereby forming the object.

14 Claims, 22 Drawing Sheets

U.S. PATENT DOCUMENTS

| | | | |
|---|---|---|---|
| 3,929,071 | * 12/1975 | Cialone et al. | 347/89 |
| 3,947,853 | 3/1976 | Denny et al. | 346/75 |
| 4,041,476 | 8/1977 | Swainson | 340/173 |
| 4,214,549 | * 7/1980 | Moser | 118/60 |
| 4,247,508 | 1/1981 | Householder | 264/219 |
| 4,386,961 | 6/1983 | Lin | 106/22 |
| 4,390,369 | 6/1983 | Merritt et al. | 106/31 |
| 4,484,948 | 11/1984 | Merritt et al. | 106/31 |
| 4,490,728 | 12/1984 | Vaught et al. | 346/1.1 |
| 4,505,669 | 3/1985 | Rogers | 432/13 |
| 4,537,631 | 8/1985 | Cooke et al. | 106/22 |
| 4,575,330 | 3/1986 | Hull | 425/174.4 |
| 4,593,292 | 6/1986 | Lewis | 346/1.1 |
| 4,629,094 | 12/1986 | Vogel et al. | 222/82 |
| 4,631,557 | 12/1986 | Cooke et al. | 346/140 |
| 4,659,383 | 4/1987 | Lin et al. | 106/27 |
| 4,665,492 | 5/1987 | Masters | 364/468 |
| 4,667,206 | 5/1987 | DeYoung | 346/1.1 |
| 4,714,934 | 12/1987 | Rogers | 346/140 |
| 4,724,983 | 2/1988 | Claassen | 222/146.5 |
| 4,739,339 | 4/1988 | DeYoung et al. | 346/1.1 |
| 4,749,347 | 6/1988 | Valavaara | 425/135 |
| 4,751,528 | 6/1988 | Spehrley, Jr. et al. | 346/140 |
| 4,752,498 | 6/1988 | Fudim | 427/54.1 |
| 4,791,440 | * 12/1988 | Eldridge et al. | 347/58 |
| 4,801,477 | 1/1989 | Fudim | 427/54.1 |
| 4,823,146 | 4/1989 | Cooke et al. | 346/1.1 |
| 4,942,060 | 7/1990 | Grossa | 427/54.1 |
| 4,951,067 | 8/1990 | Spehrley, Jr. et al. | 346/140 |
| 4,961,154 | 10/1990 | Pomerantz et al. | 364/552 |
| 4,992,806 | 2/1991 | Peer | 346/140 |
| 4,999,143 | 3/1991 | Hull et al. | 264/22 |
| 4,999,652 | * 3/1991 | Chan | 347/86 |
| 5,021,802 | 6/1991 | Allred | 346/1.1 |
| 5,031,120 | 7/1991 | Pomerantz et al. | 364/522 |
| 5,041,161 | 8/1991 | Cooke et al. | 106/22 |
| 5,043,741 | 8/1991 | Spehrley, Jr. | 346/1.1 |
| 5,059,266 | 10/1991 | Yamane et al. | 156/64 |
| 5,075,689 | 12/1991 | Hoisington | 356/1.1 |
| 5,121,329 | 6/1992 | Crump | 364/468 |
| 5,124,717 | * 6/1992 | Campanelli et al. | 347/93 |
| 5,126,529 | 6/1992 | Weiss et al. | 219/121.6 |
| 5,134,569 | 7/1992 | Masters | 364/474.24 |
| 5,136,515 | 8/1992 | Helinski | 364/468 |
| 5,140,937 | 8/1992 | Yamane et al. | 118/695 |
| 5,141,680 | 8/1992 | Almquist et al. | 264/22 |
| 5,153,657 | * 10/1992 | Yu et al. | 399/350 |
| 5,171,360 | 12/1992 | Orme et al. | 75/331 |
| 5,172,135 | 12/1992 | Creagh et al. | 346/1.1 |
| 5,207,371 | * 5/1993 | Prinz et al. | 228/125 |
| 5,216,616 | 6/1993 | Masters | 364/474.24 |
| 5,235,350 | 8/1993 | Lin et al. | 346/140 R |
| 5,260,009 | 11/1993 | Penn | 264/40.1 |
| 5,303,141 | 4/1994 | Batchelder et al. | 364/149 |
| 5,312,224 | 5/1994 | Batchelder et al. | 415/73 |
| 5,340,433 | 8/1994 | Crump | 156/578 |
| 5,362,427 | 11/1994 | Mitchell, Jr. | 264/22 |
| 5,489,925 | 2/1996 | Brooks et al. | 347/6 |
| 5,506,607 | * 4/1996 | Sanders, Jr. et al. | 347/1 |
| 5,541,624 | 7/1996 | Cooke et al. | 346/141 |
| 5,552,810 | * 9/1996 | Matsuo | 347/19 |
| 5,555,007 | 9/1996 | Ceschin et al. | 347/87 |
| 5,572,243 | * 11/1996 | Hermanson | 347/29 |
| 5,572,431 | 11/1996 | Brown et al. | 364/468.01 |
| 5,595,223 | 1/1997 | Hayao | 141/375 |
| 5,657,904 | 8/1997 | Frates et al. | 222/146.5 |
| 5,743,189 | * 4/1998 | Compera et al. | 101/487 |
| 5,745,133 | * 4/1998 | Hendricks et al. | 347/33 |
| 5,804,256 | * 9/1998 | Schäfer | 427/558 |
| 5,818,718 | * 10/1998 | Thomas et al. | 364/468.26 |

FOREIGN PATENT DOCUMENTS

| | | |
|---|---|---|
| 426363 | 5/1991 | (EP) . |
| 581445 | 2/1994 | (EP) . |
| 2583333 | 12/1986 | (FR) . |
| 2583334 | 12/1986 | (FR) . |
| 1556451 | 11/1979 | (GB) . |
| 51-10813 | 4/1976 | (JP) . |
| 5-11751 | 3/1989 | (JP) . |
| 3-236940 | 10/1991 | (JP) . |
| WO 89/02575 | 3/1989 | (WO) . |
| WO 90/01727 | 2/1990 | (WO) . |
| WO 91/08902 | 6/1991 | (WO) . |
| WO 91/10711 | 7/1991 | (WO) . |

* cited by examiner

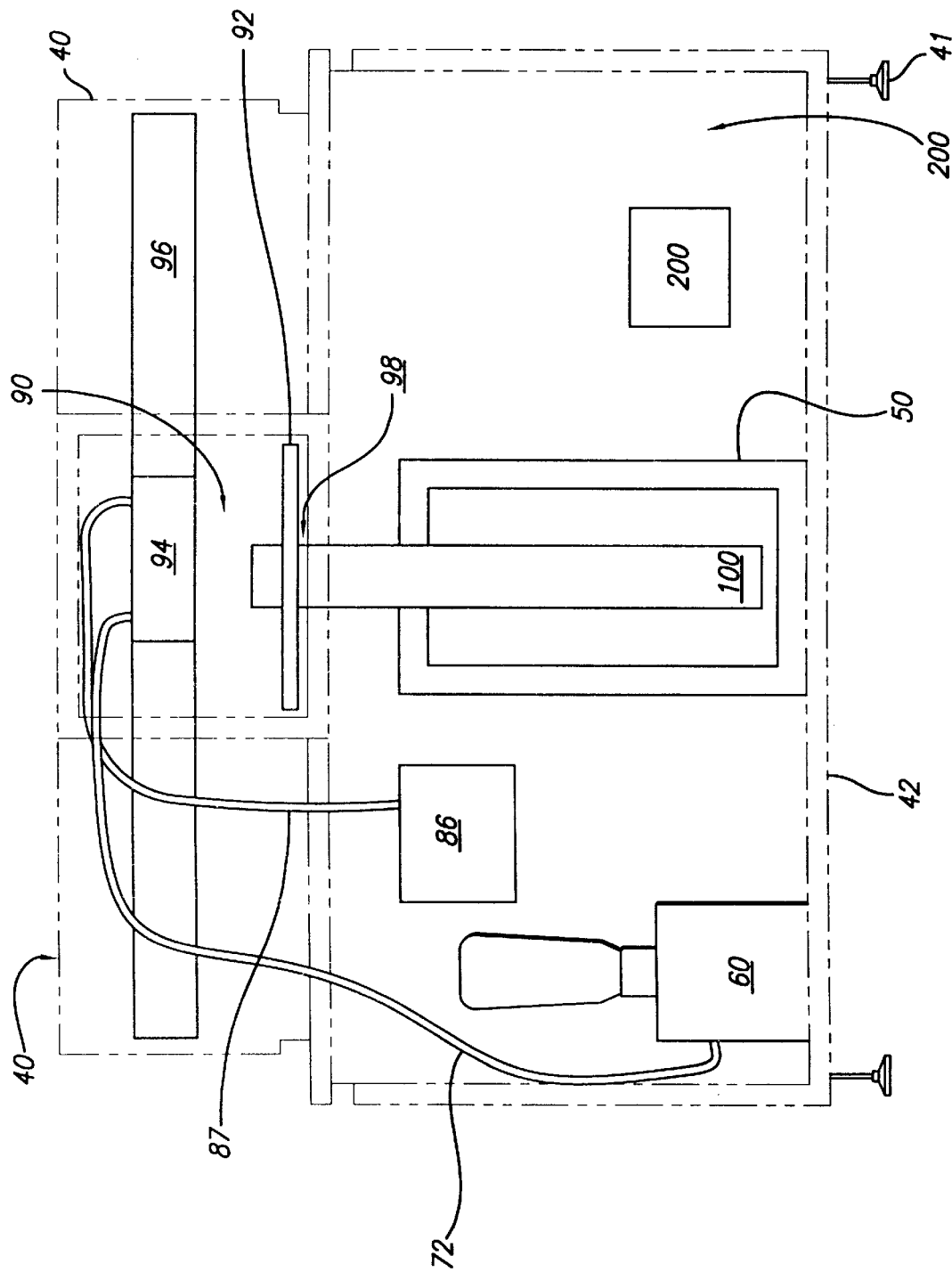

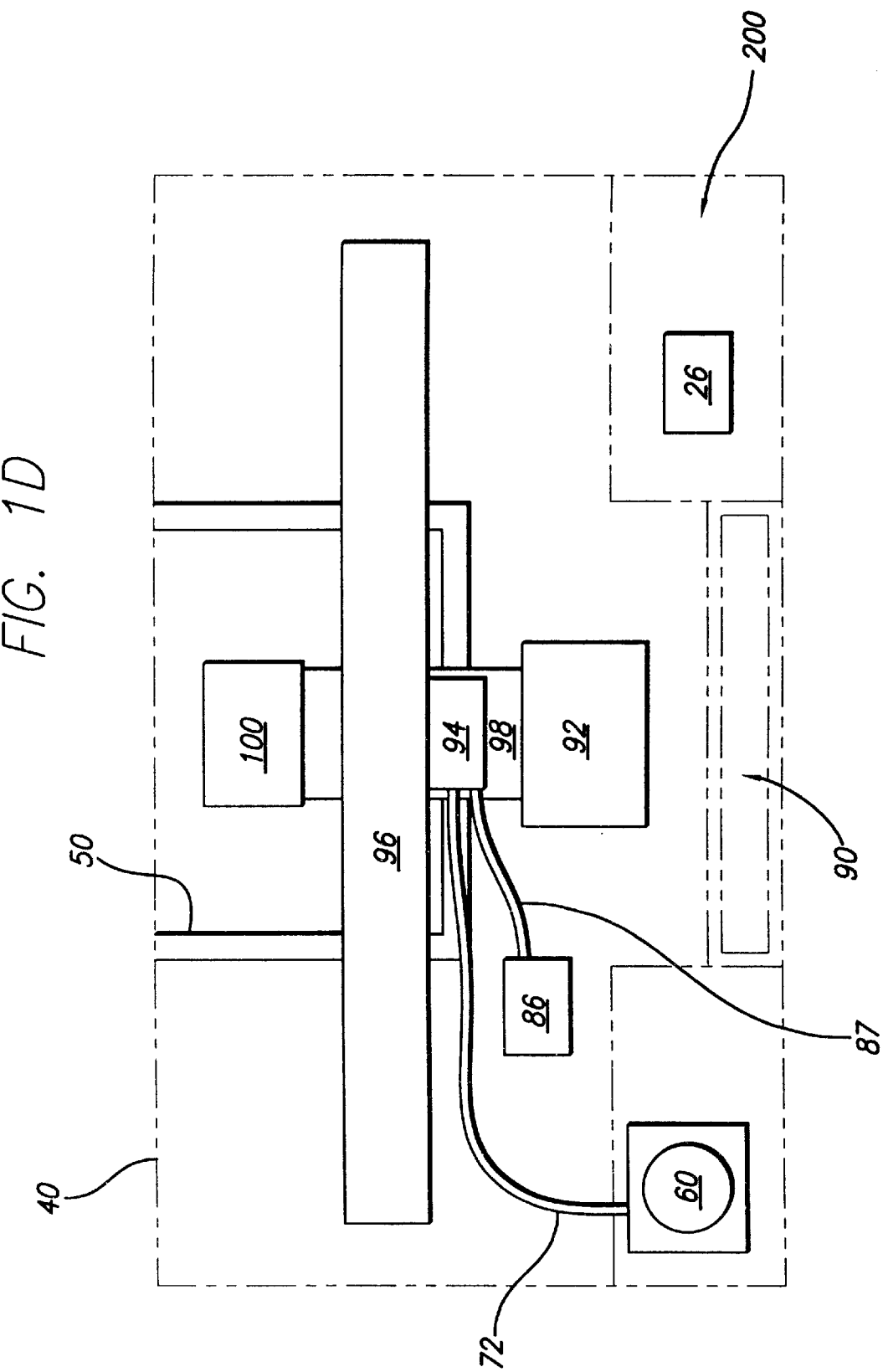

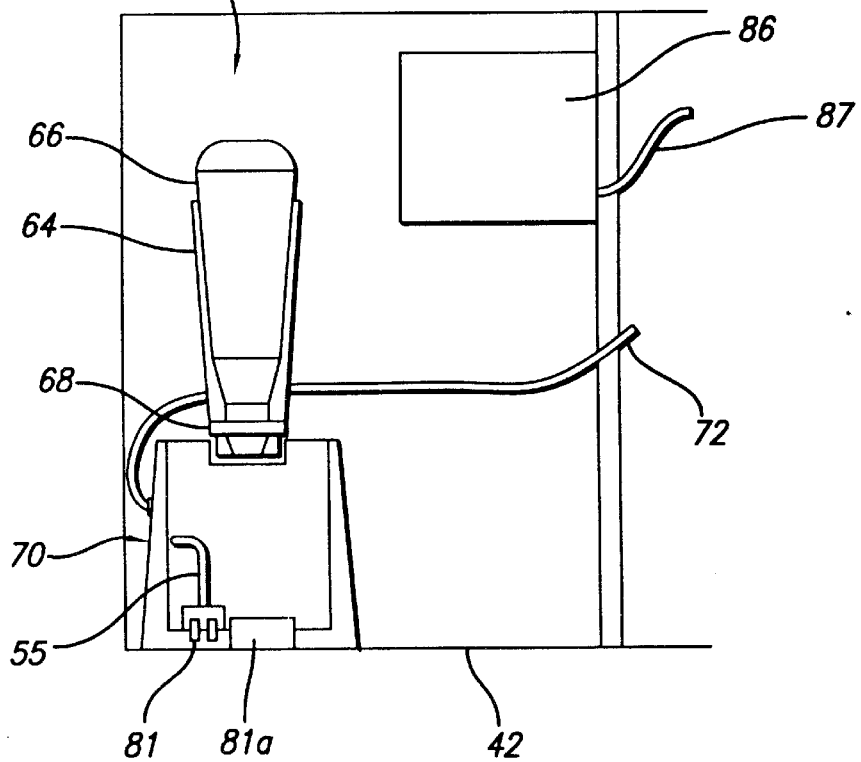
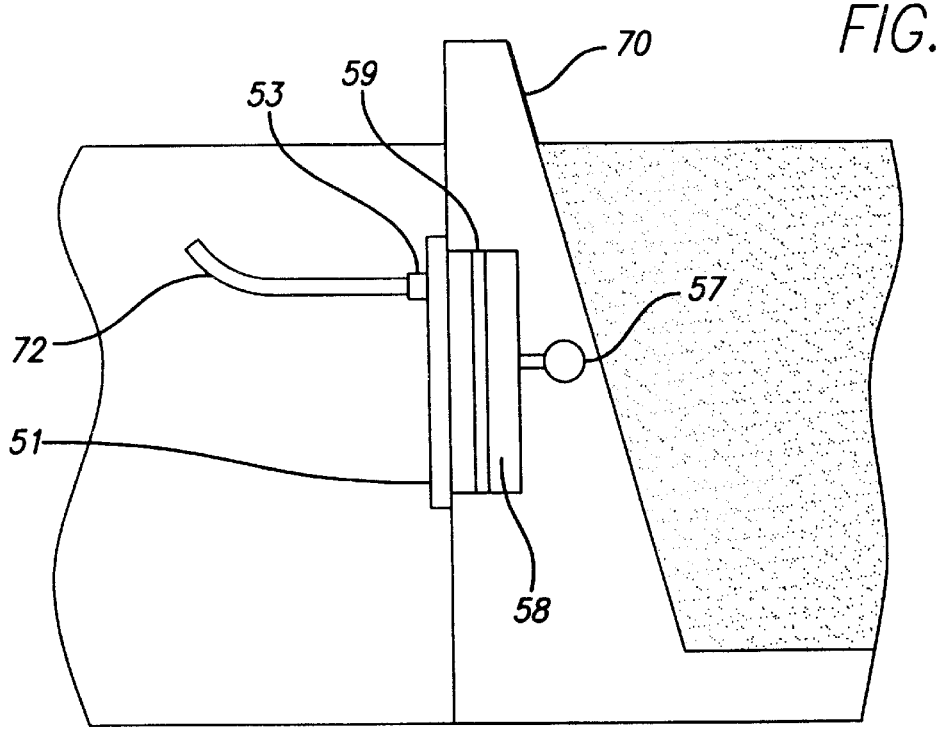

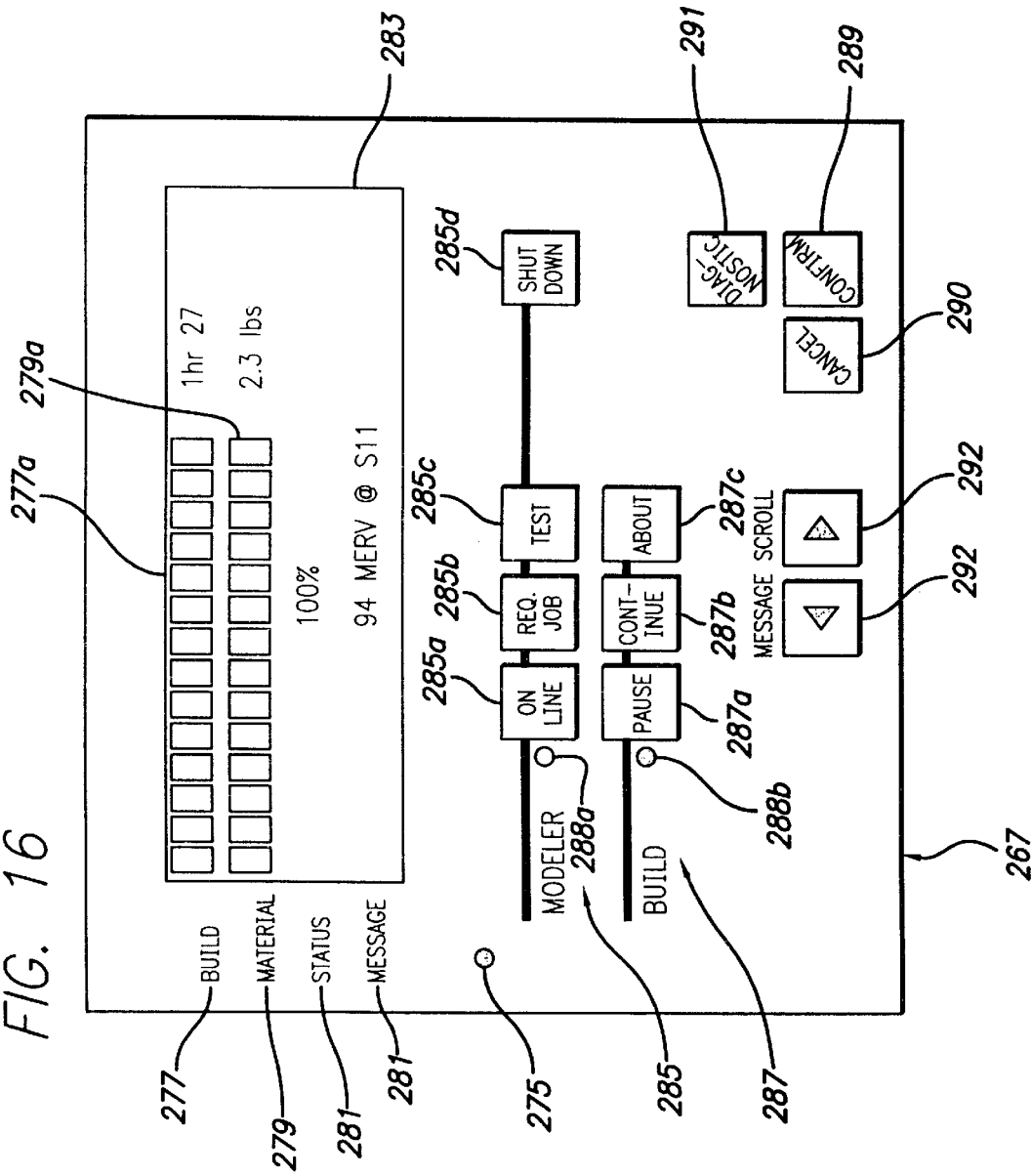

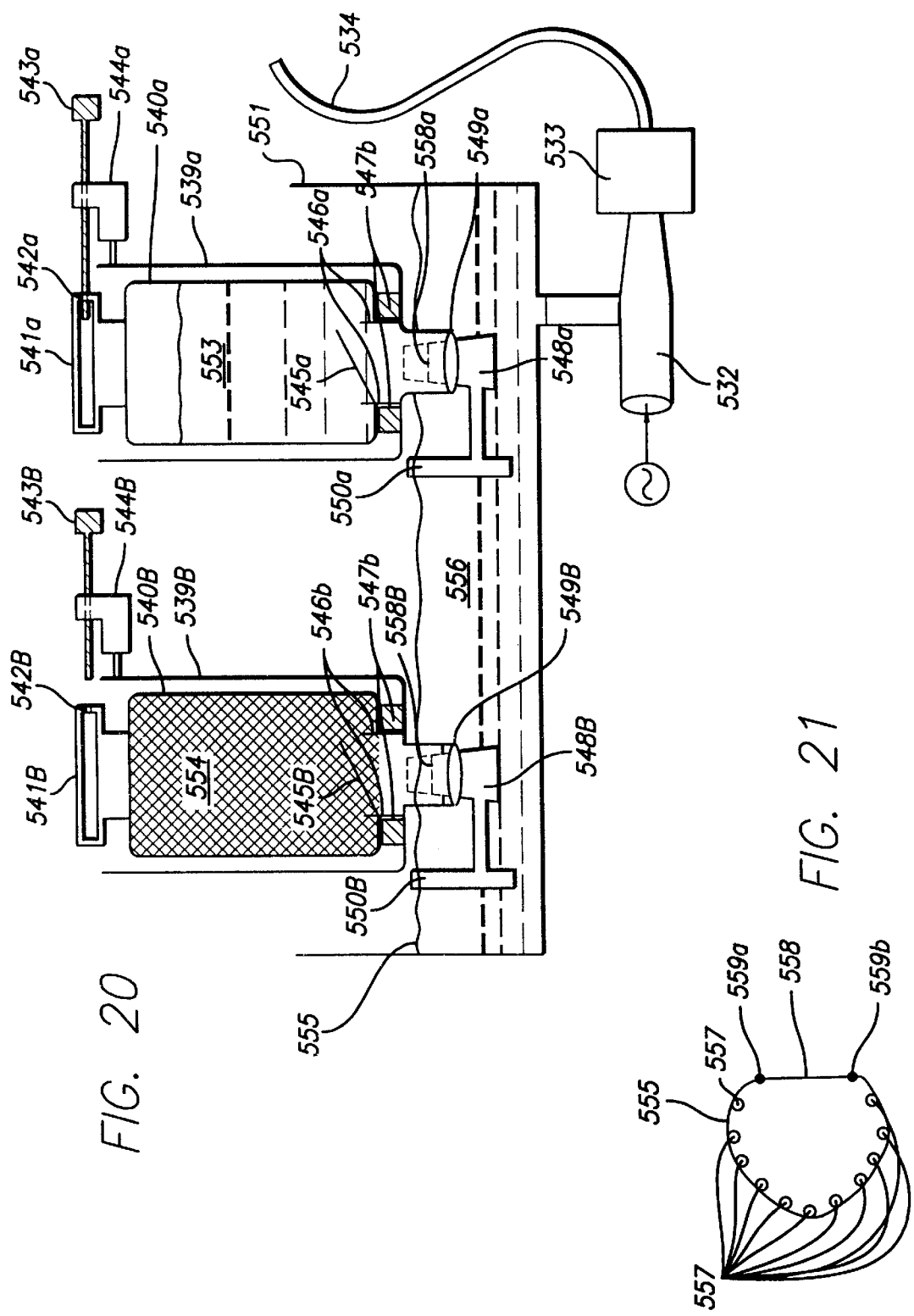

SELECTIVE DEPOSITION MODELING SYSTEM AND METHOD

This application is a continuation of 08/534,477, Sep. 27,1995, now abandoned.

1. FIELD OF THE INVENTION

The field of the invention relates generally to systems and associated methods for forming three-dimensional objects, and more specifically, to the formation of three-dimensional objects from a material which may be dispensed in a flowable state but which may solidify or otherwise physically transform after being dispensed.

2. BACKGROUND INFORMATION

Various approaches to automated or semi-automated three-dimensional object production or rapid prototyping & manufacturing ("RP&M") have become available in recent years, characterized in that each proceeds by building up three-dimensional objects from computer data descriptive of the object in an additive manner from a plurality of formed and adhered laminae. These laminae are sometimes called object cross-sections, layers of structure, object layers, layers of the object, or simply layers (if the context makes it clear that solidified structure of appropriate shape is being referred to). Each lamina represents a cross-section of the three-dimensional object. Typically lamina are formed and adhered to a stack of previously formed and adhered laminae. In some RP&M technologies, techniques have been proposed which deviate from a strict layer-by-layer build up process wherein only a portion of an initial lamina is formed and prior to the remaining portion(s) of the initial lamina at least one subsequent lamina is at least partially formed.

According to one such approach, a three-dimensional object is built up by applying successive layers of unsolidified, flowable material to a working surface, and then selectively exposing the layers to synergistic stimulation in desired patterns, causing the layers to selectively harden into object laminae which adhere to previously-formed object laminae. In this approach, material is applied to the working surface both to areas which will not become part of an object lamina, and to areas which will become part of an object lamina. Typical of this approach is Stereolithography (SL), as described in U.S. Reexamination Certificate No. B1 4,575,330, to Hull. According to one embodiment of Stereolithography, the synergistic stimulation is radiation from a UV laser, and the material is a photopolymer. Another example of this approach is Selective Laser Sintering (SLS), as described in U.S. Pat. No. 4,863,538, to Deckard, in which the synergistic stimulation is IR radiation from a $CO_2$ laser and the material is a sinterable powder. A third example is Three-dimensional Printing (3DP) and Direct Shell Production Casting (DSPC), as described in U.S. Pat. Nos. 5,340,656 and 5,204,055, to Sachs, et al., in which the synergistic stimulation is a chemical binder, and the material is a powder consisting of particles which bind together upon selective application of the chemical binder.

According to a second such approach, an object is formed by successively cutting object cross-sections having desired shapes and sizes out of sheets of material to form object lamina. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a $CO_2$ laser. U.S. Pat. 5,015,312 to Kinzie also addresses LOM.

Various issues arise with respect to the foregoing approaches however. Though the approach involving a photopolymer and UV laser has come into wide use and produces highly accurate objects, the use of photopolymers presents handling, disposal and toxicity issues. Furthermore, where lasers are used in any of the above approaches, safety concerns exist.

In addition, systems embodying any of the foregoing approaches may be generally expensive to purchase and operate because, for example, components such as lasers and scanning mirror systems are themselves expensive and/or need replacement or calibration over time. Furthermore, any of the foregoing approaches may require too much space and/or require a high level of expertise in operating the building apparatus which may prohibit their use in a typical office setting.

More recently, a third approach to rapid prototyping and manufacturing has emerged whereby an object cross-section is formed by selectively dispensing an unsolidified, flowable material onto a working surface in desired patterns in areas which will become part of the object cross-section. The material is then allowed or caused to solidify or otherwise physically transform to form the object cross-section and simultaneously adhere to the previous object cross-section. These steps are then repeated to successively build up the object cross-section by cross-section. A primary difference between this approach and earlier approaches, e.g., Stereolithography, is that the material is typically selectively dispensed only in those areas which will become part of an object cross-section.

Typical of this approach is thermal stereolithography as described in U.S. Pat. No. 5,141,680 to Almquist et al. Also typical of this approach is Fused Deposition Modeling as described in U.S. Pat. Nos. 5,121,329 and 5,340,433 to Crump in which a thermosettable material is dispensed while in a molten state and then hardens after being allowed to cool. Another example is described in U.S. Pat. No. 5,260,009 to Penn. Another example is Ballistic Particle Manufacturing as described in U.S. Pat. Nos. 4,665,492; 5,134,569 and 5,216,616 to Masters, in which ballistic particles are directed to specific locations to form object cross-sections.

However, in certain of the embodiments of the patents directed to this third approach, little detail is provided as to the actual hardware, software or other system aspects used to implement this approach. Furthermore, these previous embodiments may also involve excessive noise and generally do not describe how such apparatus or methods might be implemented to ease operation such that the approach might be used by various personnel in an office environment. Additionally, these previous systems and methods are typically slow and often require trained operators.

Accordingly, there is a need in the three-dimensional modeling or rapid prototyping and manufacturing field for a system and associated method for forming three-dimensional objects which may produce objects safely, easily and within an office environment. There is a further need for this system and associated method to be less expensive and produce objects quicker and more reliably than previous systems or methods.

All patents referred to in this specification are hereby incorporated by reference as if set forth in full.

3. RELATED PATENTS AND APPLICATIONS

The assignee of the subject application, 3D Systems, Inc., is filing this application concurrently with the following related applications, all of which are incorporated by reference herein as though set forth in full:

| Docket No. | Filing Date | Application No. | Title | Status |
|---|---|---|---|---|
| USA-131 | Concurrently herewith | Not yet determined | Selective Deposition Modeling Method and Apparatus for Forming Three-Dimensional Objects and Supports | Pending |
| USA-132 | Concurrently herewith | Not yet determined | Method and Apparatus for Data Manipulation and System Control in a Selective Deposition Modeling System | Pending |
| USA-133 | Concurrently herewith | Not yet determined | Selective Deposition Modeling Materials and Method | Pending |

Docket No. USA-131 is directed to Build and Support styles and structures which can be used in a preferred Selective Deposition Modeling (SDM) system based on thermal stereolithography principles. Alternative build and support styles and structures are also described for use in other SDM systems as well as for use in other rapid prototyping and manufacturing systems.

Docket No. USA-132 is directed to data transformation techniques for use in converting three-dimensional object data into support and object data for use in a preferred thermal stereolithography system. This Application is also directed to various date handling, data control, and system control techniques for controlling a preferred thermal stereolithography system Docket No. USA-133 is directed to the preferred material used by the preferred DSM/TSL system described herein after. Some alternative materials and methods are also described.

The assignee of the instant application, 3D Systems, Inc., is also the owner of a number of other U.S. Patent Applications and U.S. Patents in the rapid prototyping and manufacturing field and particularly in the stereolithography portion of that field. The following commonly owned U.S. Patent Applications and U.S. Patents are hereby incorporated by reference as if set forth in full herein.

| App. No. | Topic | Status |
|---|---|---|
| 08/148,544 | Fundamental elements of Thermal Stereolithography are described. | Allowed |
| 08/484,582 | Fundamental elements of Stereolithography are taught. | Pending |
| 08/475,715 | Various recoating techniques for use in SL are described including a material dispenser that allows for selective deposition from a plurality of orifices | Pending |
| 08/479,875 | Various LOM type building techniques are described. | Pending |
| 08/486,098 | A description of curl distortion is provide along with various techniques for reducing this distortion. | Pending |
| 08/475,730 | A description of a 3D data slicing technique for obtaining cross-sectional data is described which utilizes boolean layer comparisons to define down-facing, up-facing and continuing regions. Techniques for performing cure-width compensation and for producing various object configurations relative to an initial CAD design are also described | Pending |

-continued

| App. No. | Topic | Status |
|---|---|---|
| 08/480,670 | A description of an early SL Slicing technique is described including vector generation and cure width compensation are described. | Pending |
| 08/428,950 | Various building techniques for use in SL are described including various build styles involving alternate sequencing, vector interlacing and vector offsetting for forming semi-solid and solid objects | Pending |
| 08/428,951 | Simultaneously multiple layer curing techniques for SL are taught including techniques for correcting errors due to over curing in the z-direction | Pending |
| 08/405,812 | SL recoating techniques using vibrational energy are described | Pending |
| 08/402,553 | SL recoating techniques using a doctor blade and liquid level control techniques are described. | Pending |
| 08/382,268 | Several SL recoating techniques are described including techniques involving the use of ink jets to selectively dispense material for forming a next layer of unsolidified material. | Pending |
| 07/182,801 | Support structures for SL are described. | 4,999,143 |
| 07/183,015 | Placement of holes in objects for reducing stress in SL objects are described. | 5,015,424 |
| 07/365,444 | Integrated SL building, cleaning and post curing techniques are described. | 5,143,663 |
| 07/824,819 | Various aspects of a large SL apparatus are described. | 5,182,715 |
| 07/605,979 | Techniques for enhancing surface finish of SL objects are described including the use of thin fill layers in combination with thicker structural layers and meniscus smoothing. | 5,209,878 |
| 07/929,463 | Powder coating techniques are described for enhancing surface finish are described. | 5,234,636 |
| 07/939,549 | Building techniques for reducing curl distortion in SL are by balancing regions of shrinkage are described | 5,238,639 |

SUMMARY OF THE INVENTION

In a first aspect of the invention, a system and associated method for forming three-dimensional objects from a material which may be rendered flowable is described.

In another aspect of the invention, a system and associated method for forming three-dimensional objects in an office setting is described.

In another aspect of the invention, a system and associated method for removing excess material from a dispensed layer is described.

In another aspect of the invention, a system and associated method for rendering a building material flowable and for selectively dispensing the flowable material to form an object is described.

In another aspect of the invention, a system and associated method for providing electronic control of the components used to build an object is described.

In another aspect of the invention, user interface and control features for a system and associated method for forming three-dimensional objects are described.

BRIEF DESCRIPTION OF THE DRAWINGS

FIG. 1c is a front view of an overall system.

FIG. 1d is a top view of an overall system.

FIG. 5 is a schematic of a material handling module with certain components shown.

FIG. 7a is a section view of a reservoir.

FIG. 16 shows a control panel.

FIG. 20 shows an alternative material handling module.

FIG. 21 shows a flat at the bottom of a bottle.

DESCRIPTION OF THE PREFERRED EMBODIMENTS

Generally, the thermal stereolithography system and method of the current invention involves building a three-dimensional object on a layer-by-layer basis under computer control. This occurs by dispensing successive layers of a building material which is rendered flowable upon application of some form of synergistic stimulation such as heat or other form of energy which may transform the material's state. Representative building materials include thermoplastic materials which are preferably nontoxic, and the disposal and handling of which are preferably not governed by restrictive government regulations. Preferably, materials such as those described in U.S. Pat. No. 5,855,836 are utilized, however this invention is in no way intended to be limited to such materials.

While in such a flowable state, the building material may be selectively dispensed from a dispenser to some or all of the areas of successive layers which are to comprise successive object cross-sections and support regions. After a given object layer is dispensed, it is allowed or caused to solidify or otherwise physically transform so as to form the object and support cross-section corresponding to that layer. A successive layer of material is then selectively dispensed onto and adhered to the preceding cross-section. As this subsequent layer solidifies or otherwise physically transforms, it forms the next object and support cross-section. This process is repeated until all object cross-sections have been formed thereby completing the object.

As noted, this building method advantageously avoids the use of lasers, toxic chemicals, complicated stamping machinery or other apparatus which may be expensive, noisy or too large, as well as dangerous if mishandled. Because this building method is preferably carried out in a relatively simple fashion, the current invention may be advantageously used in a typical office environment by various operators.

Figure 1A:
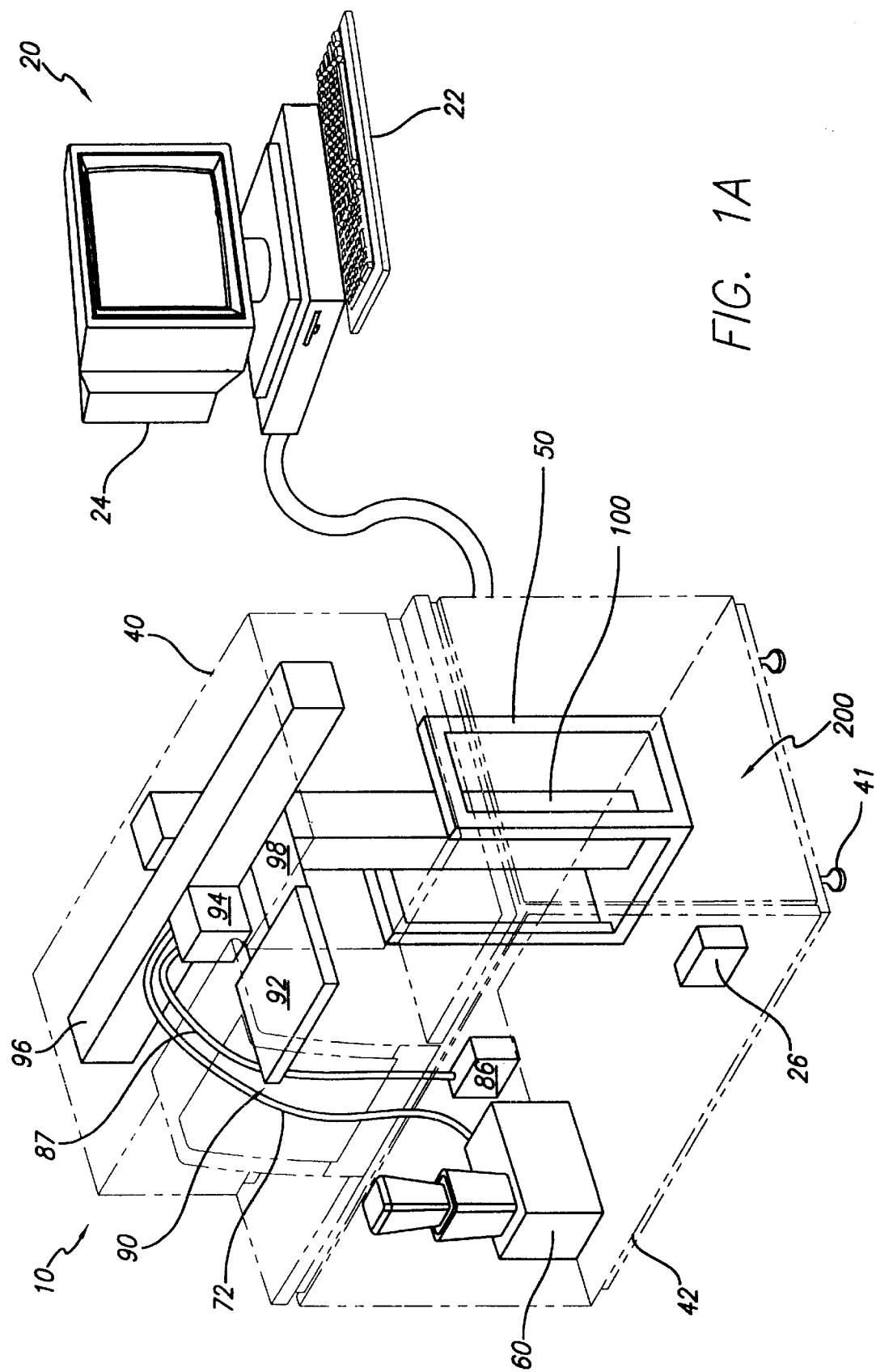
FIG. 1a is a perspective view of an overall system.
Figure 15:
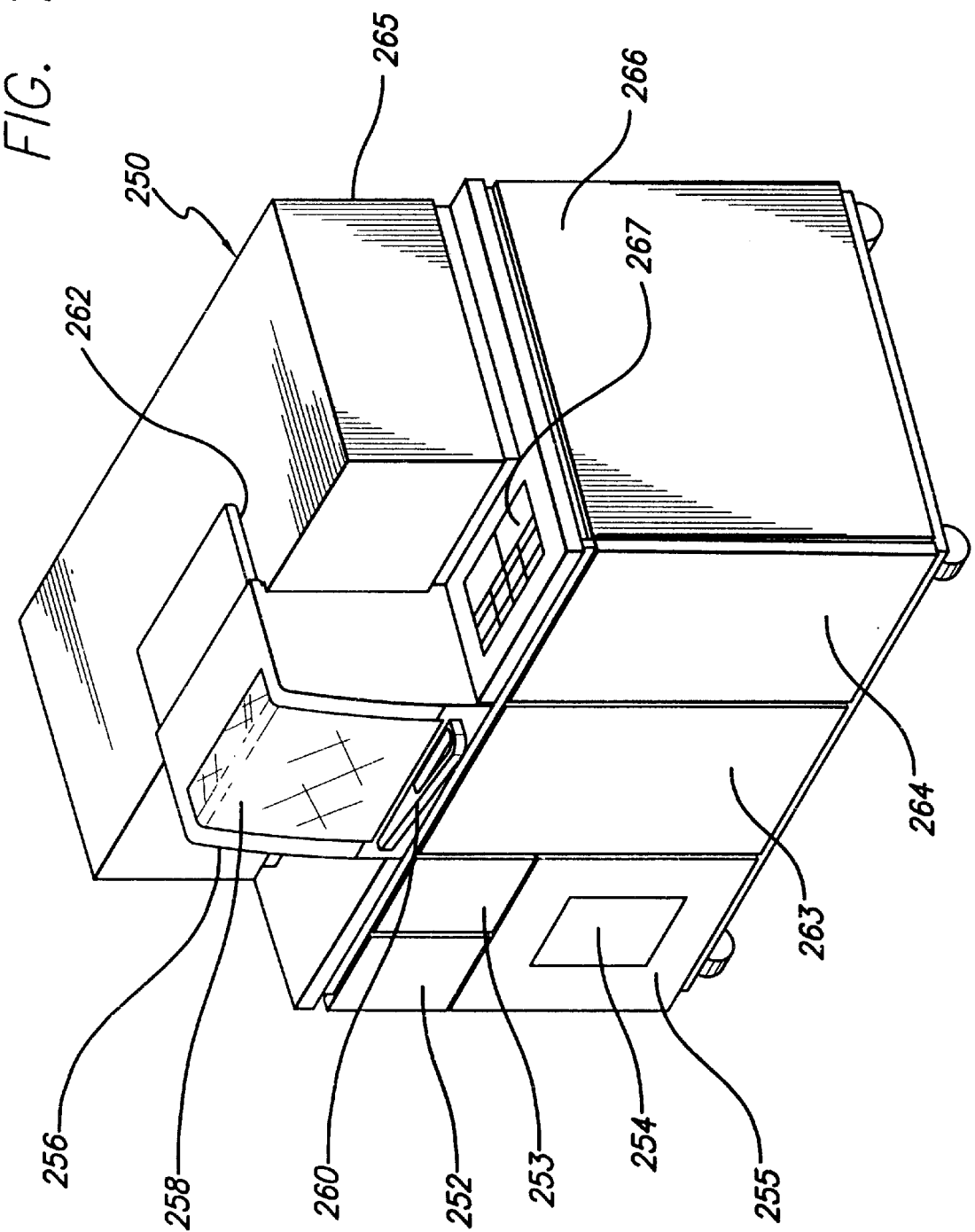
FIG. 15 shows an enclosure.

An overview of several primary aspects of a first embodiment of the current invention is now provided, which is then followed by more detailed discussion. A schematic of the overall system 10 is shown in FIG. 15, but reference is now made to FIGS. 1a–1d which show several of the components contained therein. As shown in FIG. 1a, system 10 may generally include control workstation 20, into which the CAD design of the object may be input such as STL or other building files, and printer 40 in which the object is built.

Workstation 20 may include keyboard 22 and monitor 24 for the entry and display of appropriate commands and user prompts. Workstation 20 may comprise a personal computer and/or UNIX operating system or other appropriate computer equipment which may already exist at the operator's facility prior to the arrival of printer 40. Workstation 20 may then interface, via Ethernet or other appropriate media, with control computer 26 which may be located in printer 40. Generally, control computer 26 receives signals and building commands from workstation 20 and in turn controls the various electronics and other components of printer 40. To accommodate office space constraints, control workstation 20 may be attached to printer 40 or may be located remotely thereto.

Figure 18:
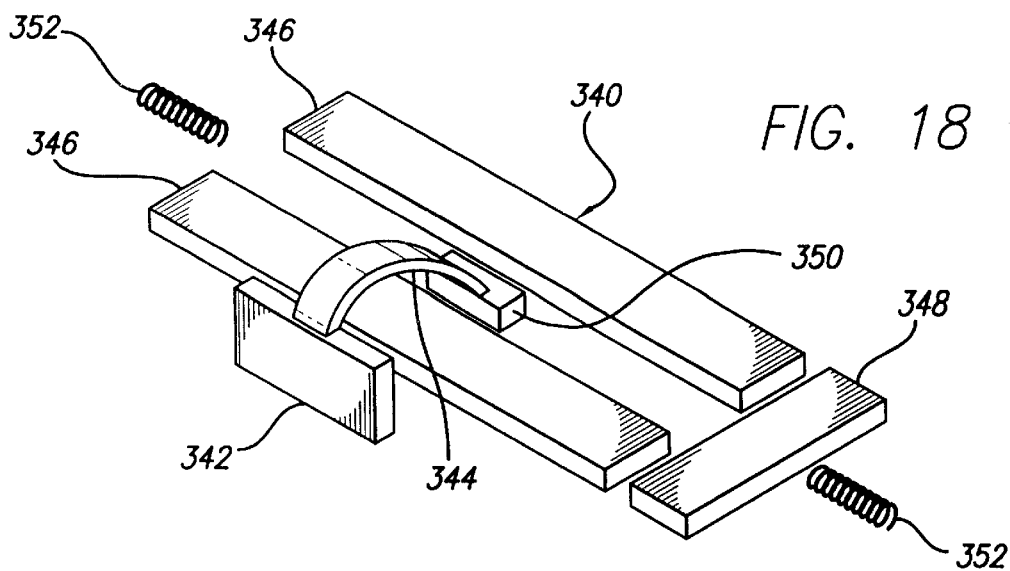
FIG. 18 shows an alternative X-stage.

To this end, it is preferred that after the computer design of the object has been input into workstation 20, the operator of printer 40 need not necessarily further interface with workstation 20, but may need only input building parameter information on control panel 267 as shown in FIGS. 15 and 18. For example, the operator may push appropriate buttons on control panel 267 to dictate various building parameters such as: the number of objects to be built, the dispenser and material to be used when multiple dispensers and or materials are incorporated into system 10, the desired resolution of the object, and other building parameters such as whether the object will be solid or hollow. Commands may also be input via control panel 267 to allow the operator to run a test so that the material dispenser may be tested before building an object. Other commands may be input and these are discussed in detail later.

Based on these inputs, control computer 26 then preferably transmits appropriate commands to the various components of printer 40 so that the object is built in desired fashion. This provides the benefit that the operator need not be intimately familiar with CAD, specific building commands, techniques or the like, thereby enabling various office personnel to build objects. Rather, the operator preferably need only input general building information, somewhat similar to one operating an office photocopying machine.

As shown in FIGS. 1a–1d, printer 40 may generally include material handling module 60, building module 90 and control module 200. Each module is described in more detail later, but for purposes of overview, material is generally loaded in material handling module 60 at which point heat or other synergistic stimulation may be added to render the material flowable. The flowable material may then be directed to building module 90 where the object is built on platform 92. Control module 200 preferably contains the various circuit boards and other mechanisms which may control the operation of printer 40. Modules 60, 90, 200 need not be separated by walls or the like as it is preferred that the building process occur at a temperature, such as ambient, that is suitable for operation of the various components in control module 200. Excess material left over from the building process may also be recovered and redelivered back to material handling module 60 for disposal or recycling.

To build an object, successive layers of building material are selectively dispensed from dispenser 94, starting with a layer which may be dispensed directly onto platform 92, and then with material layers being dispensed onto the preceding layer/cross-section. To form a layer, dispenser 94 may sweep back and forth along X-stage 96 so that dispenser 94 travels above and across platform 92. For each pass, dispenser 94 preferably dispenses material only at those locations which will comprise an object cross-section or supports therefor.

Between each pass or group of multiple passes of platform 92 along X-stage 96, platform 92 may be incrementally moved along Y-stage 98, i.e., in the direction transverse to the sweep direction of dispenser 94. This allows dispenser 94 to successively dispense material on adjacent transverse areas so that material may be selectively dispensed over the entire area of the layer being formed. After a layer is dispensed, platform 92 may be lowered relative to dispenser 94 along Z-stage 100 in preparation of forming the next layer. This procedure is then repeated until the object is completed.

Generally, operation of the components associated with the material and building modules 60, 90 are controlled by various printed circuit boards and other control components which may be contained in control module 200 and/or other locations. To control the building process, control computer 26 generally receives signals from workstation 20 and control panel 267 as well as feedback signals from material and building modules 60, 90. These signals are then processed and transmitted to the various building components.

As shown in more detail in FIG. 15, system 10 may include enclosure 250 which covers the interior components to provide an aesthetically pleasing system suitable for an office environment. As discussed later, enclosure may also serve to squelch noises produced by the building operation and preferably includes various access to doors to access components therein, and windows to view the building process as it occurs.

Figure 2:
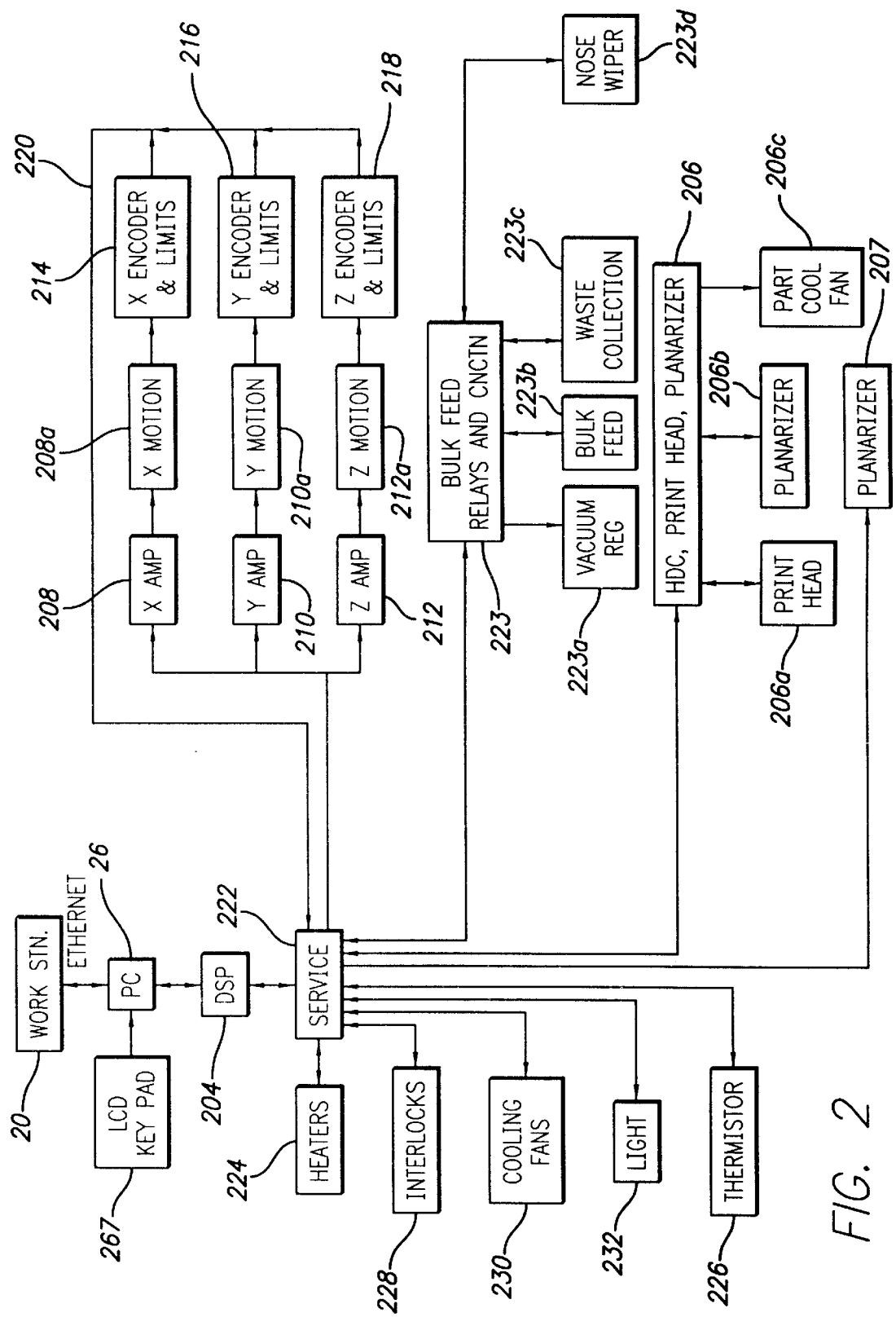
FIG. 2 is a control system functional diagram.

The overall control configuration of system 10 is now described with reference to FIG. 2 which shows the routing of various control signals in system 10. It should be noted that components in addition to those shown in FIG. 2 may be included in printer 40 and that FIG. 2 is not intended to be limiting in this regard. Following this overall control description, the components of system 10 are discussed in more detail.

As shown, any commands not available on the provided control panel 267 are input into control computer 26 from workstation 20. Control computer 26 may comprise a personal computer or other suitable means of control. The connection to control computer 26 may be via an ethernet, but alternative communication media may be used. Control computer 26 may transmit control signals to digital signal processor board ("DSP") 204, but alternatively, control computer 26 may be subsumed into DSP 204. Control computer 26 may also transmit control signals to services board 222 which transmission may occur directly or through DSP 204.

Generally, DSP 204 may control the motion of dispenser 94 and the dispensing of material therefrom, as well as the motion of X-stage 96, Y-stage 98 and Z-stage 100. Services board 222 may control the various heaters described below, as well as other maintenance type of functions of printer 40.

In addition, a logic board (not shown) may provide communication between control computer 26 and DSP 204 by processing signals from control computer 26 into a form suitable for utilization by DSP 204. The logic board may also provide communication between control computer 26/DSP 204 and workstation 20/control panel 267. DSP 204 may then transmit control signals to services board 222. In addition, an input/output board (not shown) may provide communication between control computer 26 and services board 222.

DSP 204 may send control signals through services board 222 and on to various components to control their movement. For example, DSP 204 may send signals to head driver board 206 to control various components of dispenser 94 such as the print head 206a when an ink jet print head is used to dispense material, planarizer 206b and part cooling fan 206c. These components are discussed in more detail later. DSP 204 may also send signals to planarizer motor 207.

DSP 204 may also control the X-, Y- and Z-stages by sending control signals to X-amplifier 208, Y-amplifier 210 and Z-amplifier 212. After the signals are amplified, they are transmitted to the X, Y and Z motors 208a, 210a and 212a respectively which in turn effect movement of the various stages, i.e., sweeping movement of dispenser 94 along X-stage 96, movement of platform 92 along Y-stage 98 between dispenser sweeps and movement of platform 92 along Z-stage 100 after a layer is dispensed.

As shown, printer 40 may include X-, Y- and Z-encoders 214, 216 and 218 which indicate the positions of dispenser 94 along X-stage 96, platform 92 along Y-stage 98 and platform 92 along Z-stage 100 respectively. Signals representing these positions may then be transmitted along servo loop 220 back to DSP 204 for any appropriate adjustment of position along the X-, Y- or Z stages 96, 98 and 100.

For example, DSP 204 may control the motion of platform 92 along Z-stage 100 and also receive position feedback control loop signals to adjust and correct platform 92 position. Feedback signals may also be provided by a Z-limits component to advise when platform 92 should be returned to its original position, which signals may be controlled by DSP 204. Servo loop 220 may be enclosed in software but it is anticipated that such control may be effected through hardware and/or a combination of software and hardware.

Position information may also be used to determine the position of the scanning print head. This print head position information may be used to determine drop sites for dispensing of building material. In this method, drop sites are determined spatially. In the alternative, if the scanning velocity and acceleration are known or can be determined, time may be used as the variable for determining drop site locations.

Services board 222 may also provide signals to control various components associated with material handling module 60. For example, services board 222 may provide signals to bulk feed relays and connections 223. Signals are then in turn provided to vacuum regulator 223a, bulk feed 223b, waste collection 223c and nosewiper 223d which components essentially serve to pump flowable material from material handling module 60 to building module 90 and to return excess material to material handling module 60. These components are discussed later.

Services board 222 may also transmit signals to control other components. As shown in FIG. 2, services board 222 may transmit signals to activate or inactivate any of several heaters 224 which may be contained in printer 40. For example, a heater may be activated which applies heat to material contained in material handling module 60, to render the material flowable and ready for transport to building module 90. To this end, thermistor 226 may be included in the control loop to provide temperature feedback information to services board 222 so that the heater may be inactivated and activated as necessary.

Services board 222 may also control any of several interlocks 228 which may be included in printer 40. As described later, interlocks 228 may be used to automatically turn off printer 40 for safety purposes if, for example, the handle 260 of access door 256 (as shown in FIG. 15) to building module 90 is opened during object formation. Services board 222 may also control other components such as cooling fans 230 which may be used to cause just-dispensed material to physically transform and/or to cool other portions of printer 40. Services board 222 may also control the lights 232 associated with control panel 267 or other LCD displays of printer 40.

Figure 3:
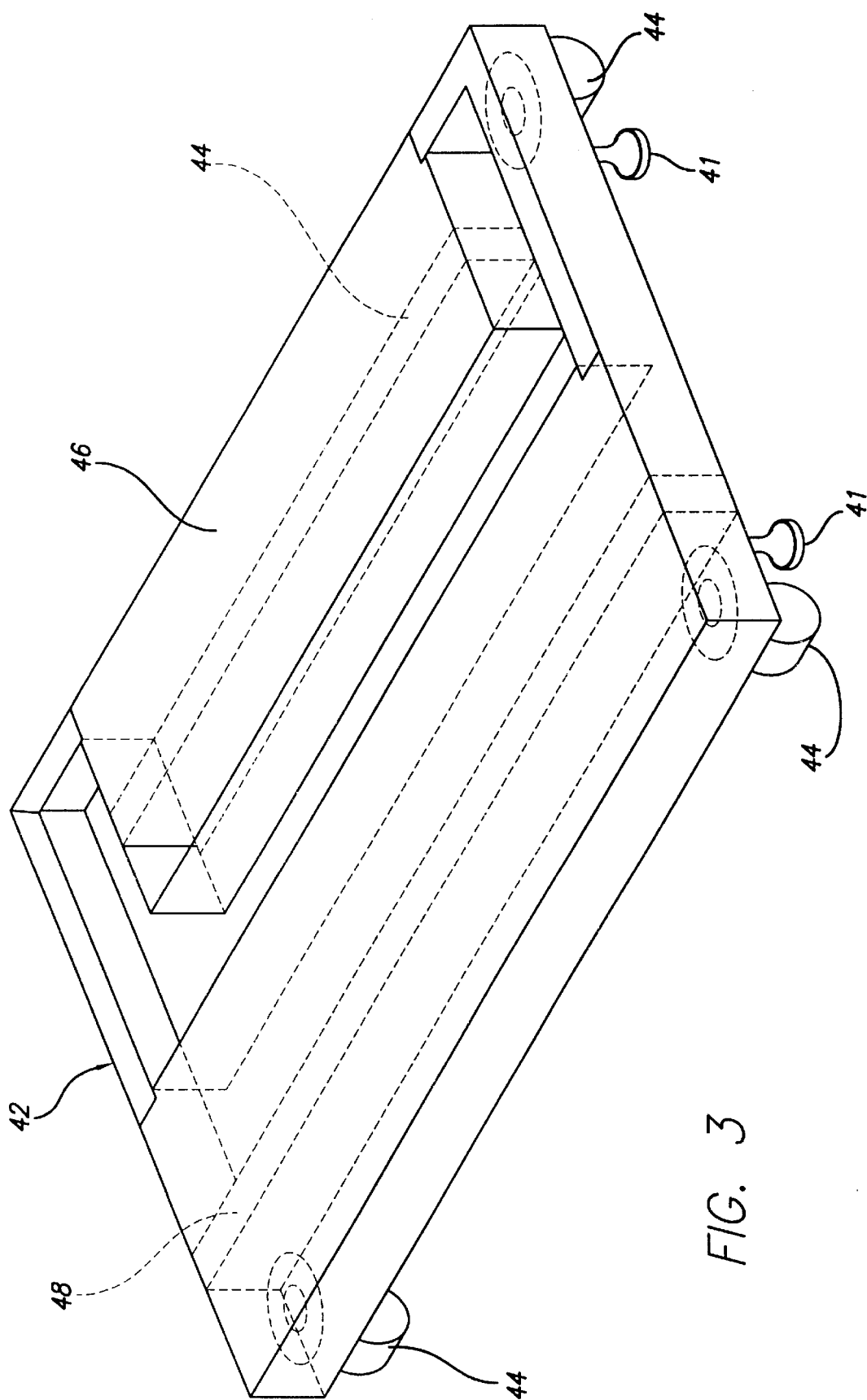
FIG. 3 shows a base assembly.

Reference is now made to FIGS. 1*a–d* and 3–11 which show printer 40 at various levels of detail and/or various components thereof. FIG. 3 shows base assembly 42 which may support printer 40. Base assembly 42 preferably includes wheels 44 so that printer 40 may be easily transported, e.g., from office to office. Base 42 preferably includes leveling feet 41 which may provide stationary support for printer 40 by lifting printer 40 slightly off of wheels 44. This avoids a possible decrease in object resolution which might otherwise occur due to movement of printer 40 caused by the acceleration/deceleration of dispenser 94 or by vibration of the entire printer 40. It is also preferred that the object be built while printer 40 is level. Alternatively, each wheel 44 may include a foot pedal (not shown) which may be depressed when printer 40 is stationary thereby raising wheels 44 slightly above the floor.

Preferably, base assembly 42 comprises a series of struts 48 which may be made of 0.318 cm cold-rolled steel to provide overall rigidity to system 10 to help maintain object resolution and dimensional accuracy during the building process. However, other support methods and materials may be used. Base 42 may also include multiple struts 48 to add rigidity. Struts 48 may be hollow to provide channels for the mounting of various cables (not shown) used in printer 40 as well as to optimize strength to weight.

Figure 4:
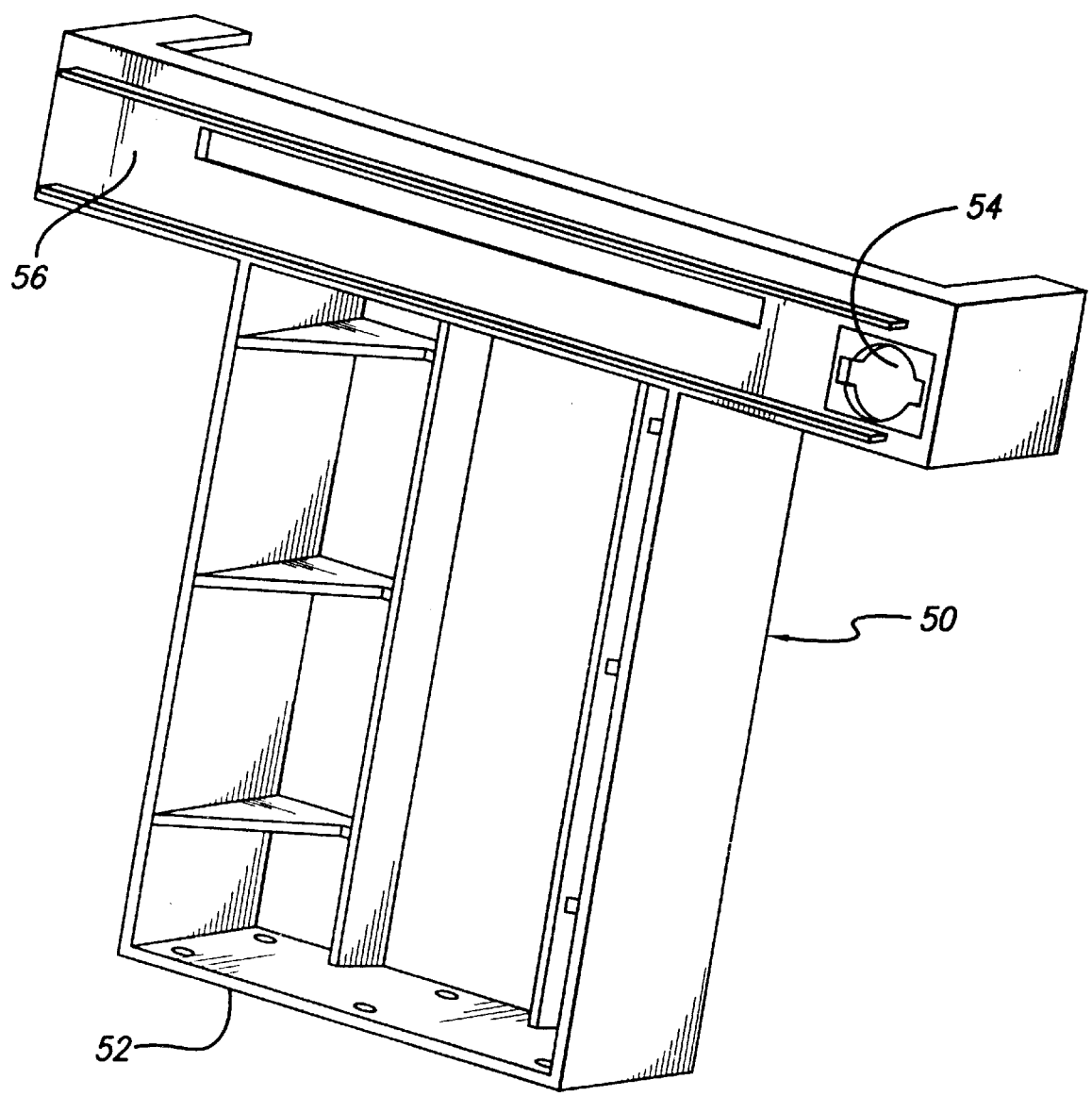
FIG. 4 shows a backbone.

FIG. 4 shows backbone 50 to which various components of printer 40 may be attached. The bottom 52 of backbone 50 may be coupled to platform 46 of base 42 shown in FIG. 3. Preferably, backbone 50 comprises cast aluminum to reduce the weight of printer 40, to provide rigidity to dampen the inertial forces arising as dispenser 94 accelerates and decelerates at either end of its sweeps across platform 92, as well as to reduce overall costs. To this end, backbone 50 may weigh approximately 59 kg. Preferably wire feedthrough(s) 54 are incorporated into the backbone 50 for cables and the like.

Also located in proximity to base 42 may be material handling module 60 which is now discussed in further detail with reference to FIGS. 1*a–d*, 5–7, 7*a* and 15. As shown in FIG. 5, material handling module 60 may include receptacle 64 for receiving bottle 66 containing material to build the object. Bottle 66 is referred to as a bottle for descriptive purposes only, any suitable container or vessel may be used. Attached to the bottom of receptacle 64 may be collar 68. Receptacle 64/collar 68 may be positioned over reservoir 70.

Building material may be supplied from reservoir 70 via feeder line 72 to building module 90. Material handling module 60 may also include waste reservoir 86 which may collect excess material from building module 90 via feeder line 87. The material collected in waste reservoir 86 may be recycled or disposed of.

Figure 6:
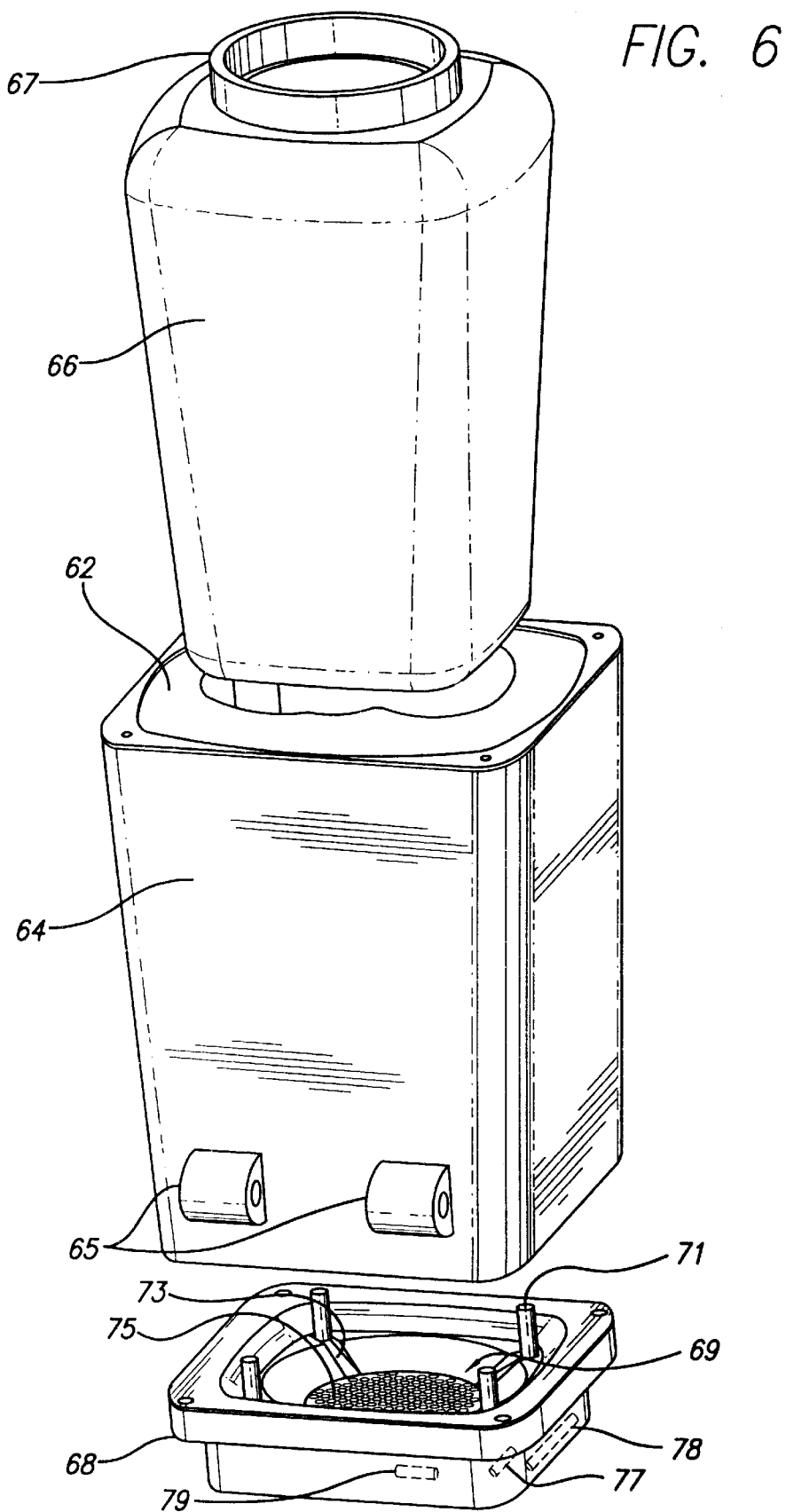
FIG. 6 shows a bottle, receptacle and collar of a material handling module.

As shown in FIG. 6, receptacle 64 is preferably configured to receive bottle 66. Receptacle 64 may be hingeably attached to door 252 of enclosure 250 via brackets 65 and a four-bar linkage (not shown) or other attachment means. Collar 68 may be sealed and attached to receptacle 64 via epoxy, bolts or other attachment means. Collar 68 also preferably includes heater 78 such as a cartridge heater manufactured by Watlow, Inc. As described below, heater 78 serves to render the material contained in bottle 66 flowable. Collar 68 may also include recess 69 to accommodate the bottom of bottle 66. Reservoir 70 may be mounted to base 42 and as shown in FIG. 5, receptacle 64/collar 68 may be positioned over reservoir 70 so that the bottom of collar 68 is over and/or within reservoir trough 88 shown in FIG. 7.

To load printer 40 with material, enclosure door 252 may be opened to provide access to material handling module 60. To this end, door 252 may be hinged at its bottom to enclosure 250 so that when opened, the top of receptacle 64 tilts outward and is directly accessible to the operator. Preferably, door 252 includes some type of linkage to control the amount it may be opened and to hold door 252/receptacle 64 in a stationary position when bottle 66 is inserted into receptacle 64.

While in bottle 66, the material is generally in a solid state and may comprise one solid mass or more preferably, a collection of prills or beads. It is preferred that bottle 66 comprise a material such as polypropylene that will not react with the material therein. This provides that bottle 66 has a sufficient shelf life before being loaded into printer 40. Other suitable materials may be used for bottle 66 however.

Bottle 66 may contain a volume of about 3.79 liters so that when a typical building material is used, bottle 66 weighs about 2.27 kg when full. This weight may be relatively easily handled by various operators in an office environment. Other bottles containing greater weights of material may be used but it is generally preferred that a full bottle 66 weigh 5 kg. or less. Bottle 66 preferably also includes cap 67 which may be grasped by the operator to ease material loading, and it is preferred that cap 67 include some type of handle for easy handling.

The interior of bottle 66 is preferably concave to facilitate the flow of material therefrom. The outside of bottle 66 is preferably angled as shown in FIG. 6 to facilitate insertion into receptacle 64. Also, the dimensions of bottle 66 preferably correspond with the inside dimensions of receptacle 64 and collar 68 to provide a secure fit. Receptacle 64 may also include gasket 62 which may comprise rubber or some other flexible material. Gasket 62 is generally pushed downward when bottle 66 is inserted and then pops back up and over part of the top of bottle 66. This further ensures a secure fit between bottle 66 and receptacle 64.

As bottle 66 is inserted into receptacle 64, the corresponding dimensions therebetween serve to guide bottle 66 downward toward collar 68. As the bottom of bottle 66 fits into recess 69, it is preferably pierced by one or more pins 71 that may be attached to collar 68. To facilitate suitable piercing, the portions of the walls of the bottom of bottle 66 where pins 71 are intended to penetrate may be thinned or fitted with easy pierce locations. The base of bottle 66 is designed from a material which may be pierced without undue effort and without bottle fracture. The operator may then continue to insert bottle 66 into receptacle 64/collar 68 until it is seated therein, and may then close door 252.

When seated, the bottom of bottle 66 is preferably located over the hole in reservoir trough 88. At this time, the heat provided by heater 78 is conducted through collar 68 and/or receptacle 64 so that heat impinges on bottle 66 to render the building material flowable. To facilitate this heat transfer, bottle 66 preferably comprises a thermally conductive material. Additionally, collar 68 and receptacle 64 may comprise aluminum or other heat conductive material. Gasket 62 also serves to contain any heat which might otherwise escape through the area around the top of bottle 66.

Figure 7:
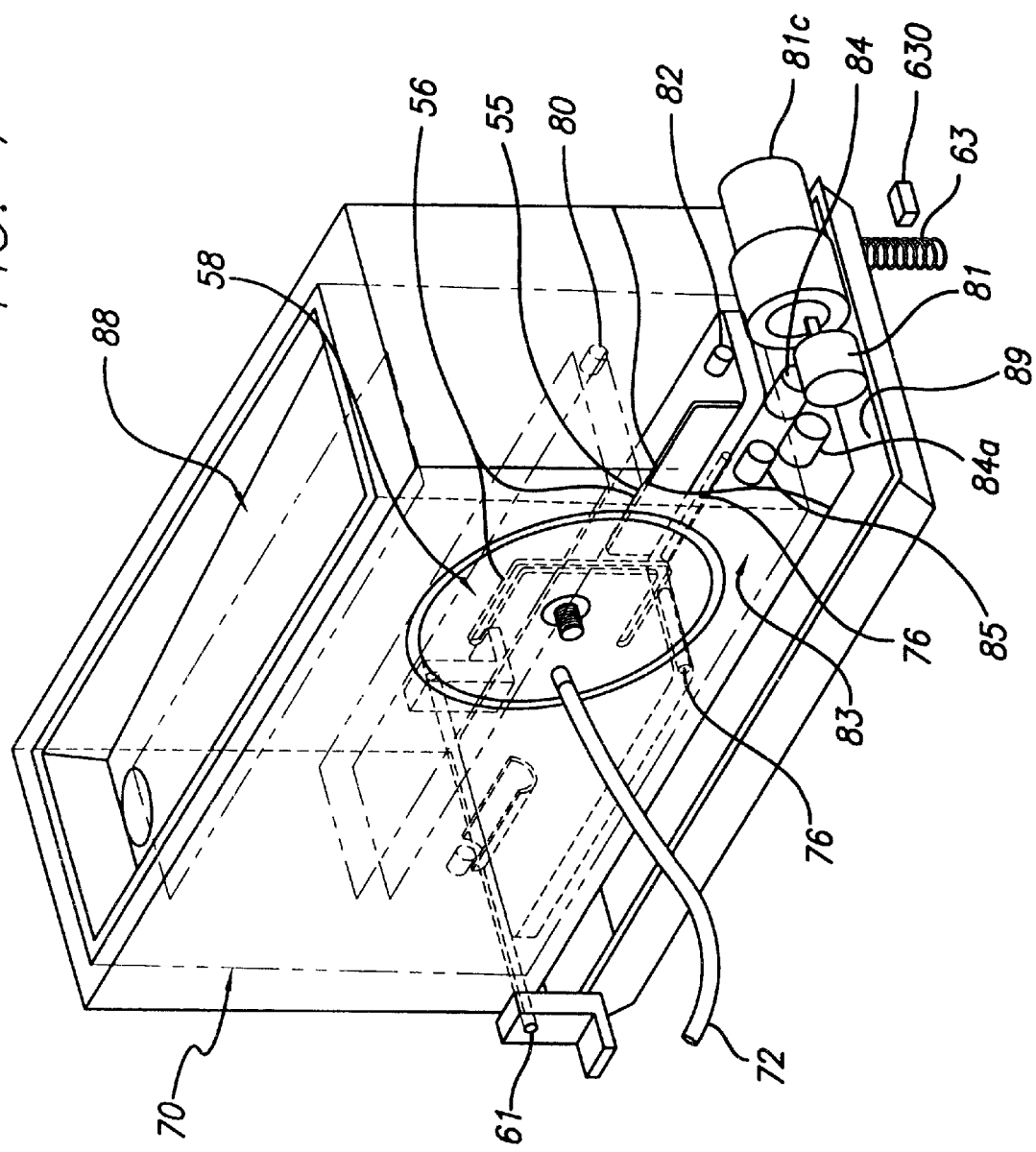
FIG. 7 shows a reservoir and other components of a material handling module.
Figure 8:
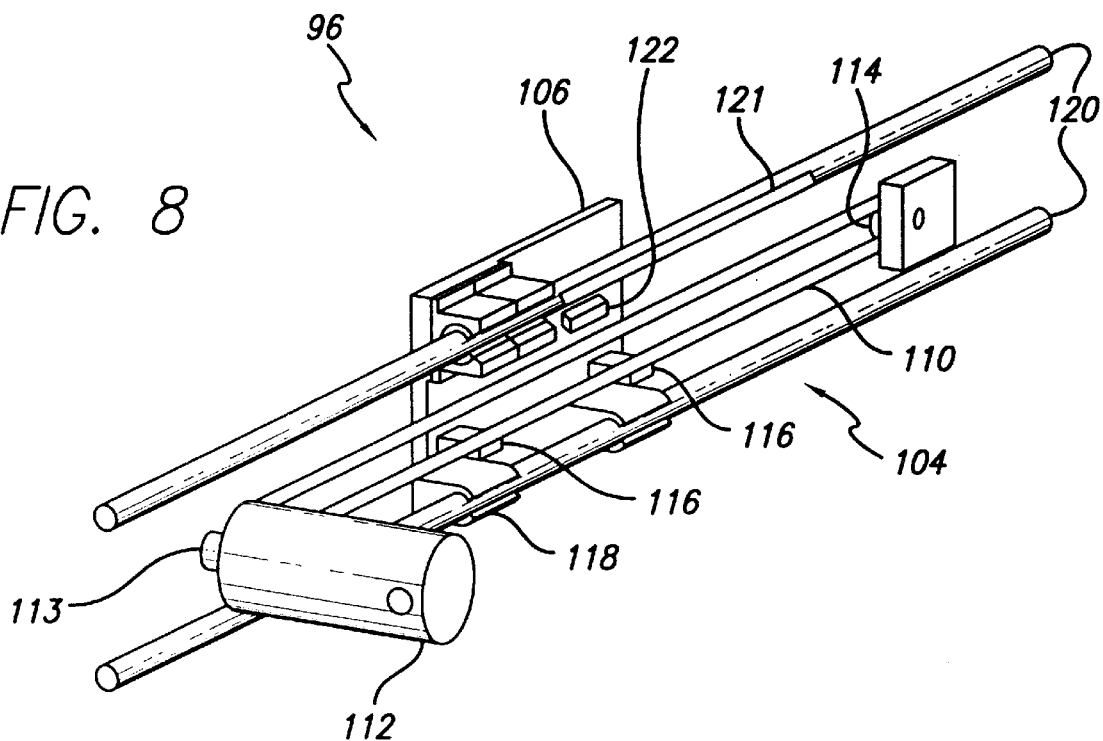
FIG. 8 shows an X-stage.

As the building material in bottle 66 becomes flowable, it flows downward through the holes created by pins 71. The flowable material may then be guided by collar channels 73 to and through collar filter 75 which may be mounted at the bottom of recess 69 and which may comprise a perforated metal sheet. Other types of filters may be used however. At this point, the material flows into reservoir 70 which is shown in FIG. 7. Gravity thus facilitates material traveling into reservoir 70 which travel might otherwise be hindered due to viscosity effects.

When door 252 is closed, receptacle 64 and thus bottle 66 are preferably positioned at an angle relative to vertical so that as bottle 66 empties, material continues to flow through at least one of the holes created by pins 71. This may avoid "puddles" being formed in the bottom of bottle 66 which could lead to material being wasted. As can be seen from FIG. 5, receptacle 64 need not directly attach to reservoir 70. Rather, receptacle 64 is preferably positioned so that bottle 66 substantially aligns over the hole in reservoir trough 88.

The heating provided by collar 68 is now further described. Heater 78 is preferably housed by a cylindrical bore or other cavity in collar 68. Alternatively, heater 78 may be mounted to the exterior of collar 68. To render the material flowable, heater 78 may be heated in the range of about 70–130 degrees Celsius.

Collar 68 also preferably includes thermistor 77 and fuse 79 which serve to control heater 78. That is, thermistor 77 may send temperature information to services board 222 as shown in FIG. 2. If the temperature information reflects a temperature which is too high, i.e., the temperature exceeds the range desired to render the material flowable, services board 222 may send a control signal to inactivate heater 78. Similarly, thermistor 77 may send information to services board 222 indicating that heater 78 should be activated. Fuse 79 may serve as an automatic safety turn-off. That is, if a certain temperature is reached in collar 68 but heater 78 has not been inactivated via thermistor 77 and services board 222, fuse 79 may itself inactivate heater 78.

For safety purposes, door 252 may be solenoid activated so that it may be opened only when receptacle 64 and/or bottle 66 have sufficiently cooled so that the operator is not burned when trying to remove bottle 66. To this end, receptacle 64 may include one or more thermistors (not shown) which provide temperature information to services board 222. In turn services board 222 may send signals to the solenoid (not shown) to either permit or prevent the opening of door 252. As an additional safety precaution, the exterior of receptacle 64 may be insulated with a two-part foam to protect against burns should the operator nonetheless contact these components when they are heated.

Reservoir 70 is preferably maintained at a temperature sufficient to keep the viscosity of building material low enough so that it may be pumped through feeder line 72 to building module 90. As shown in FIG. 7, one or more heaters 76 may be incorporated into reservoir 70 to maintain the material temperature in the flowable range. Suitable heaters 76 may be cartridge heaters manufactured by Watlow, Inc. When the building material comprises a preferable thermal stereolithography material, reservoir 70 is preferably maintained at a temperature of about 90 degrees Celsius. To facilitate heat transfer from heaters 76 to the building material, reservoir 70 may comprise aluminum or other thermal conductive material.

Thermistor(s) 78 may be placed in or adjacent reservoir 70 to provide temperature feedback information to services board 222 as shown in FIG. 2. In this manner, heater(s) 76 may be activated as necessary to maintain the desired material temperature, and also inactivated when not needed to reduce power consumption.

Preferably, reservoir 70 may contain a volume of about 7 liters of building material which is sufficient to form objects weighing about 5.5 kg. This size of reservoir 70 is adequate to receive approximately two bottles of material and also adequate to allow printer 40 to operate over a period of time while unattended, e.g., over a weekend. Though reservoir 70 is shown to be somewhat rectangular, it may assume other shapes.

Should reservoir 70 already be full when bottle 66 continues to drain, reservoir trough 88 may receive an additional volume of material. If reservoir 70 and trough 88 are both full when bottle 66 continues to drain, tray 89 may collect any material that flows over and down the sides of reservoir 70. Tray 89 may comprise polypropylene but other materials may be used.

When initially setting up and using printer 40, several bottles 66 of building material may be consecutively fed into material loading module 60 to "prime" printer 40 so that the material level in reservoir 70 may be raised to a desired minimum level such as that which is aligned with sensor 80 as shown in FIG. 7. When material is later drawn from reservoir 70 by pump 81, if the material level falls below sensor 80, sensor 80 may send a signal to services board 222 to activate heaters 78 in collar 68 to melt more material in bottle 66 to replenish reservoir 70. When bottle 66 is empty, it may be removed and replaced with a full bottle 66.

As a safeguard, reservoir 70 may include an emergency shut-off material level sensor 82 which may be located below sensor 80 but above the floor of reservoir 70. Sensor 82 serves to prevent material depletion or near material depletion in handling module 60 by shutting off printer 40 should the material fall therebelow. Material depletion or near material depletion is preferably avoided to prevent the situation where only a small volume of material is flowing from reservoir 70, through line 72 and out of dispenser 94. This is because it has been determined that when only a small volume is flowing, the material tends to adhere or "carmelize" onto the interior of reservoir 70, feeder line 72 and dispenser 94. Such carmelization ultimately results in the blocking of line 72 as well as other components.

On the other hand, it should be noted that there is not a major concern that air bubbles may form in feeder line 72. Though this may lead to temporary sporadic dispensing of material from dispenser 94, it is not viewed as damaging as is carmelization.

To help avoid material depletion, the operator may view reservoir 70 through window 254 in door 255 of enclosure 250, but preferably, sensor 80 provides an audible signal, in addition to initiating the melting of additional material in bottle 66. And as indicated above, sensor 82 preferably shuts off printer 40 by an appropriate control signal to services board 222 should that lower level be reached. Sensors 80 and 82 may be of the type manufactured by Spectra, Inc.

Another feature providing information reflecting the volume of material remaining in reservoir 70 is now described. As shown in FIG. 7, one end of reservoir 70 is mounted to pivot 61 while the other end is mounted on spring 63. Optical sensor 63a may be mounted in proximity to reservoir 70 as shown.

As material is drawn from reservoir 70 thereby reducing its weight, spring 63 pushes up on its end of reservoir 70 which causes reservoir 70 to rotate about pivot 63. To this end, the compressibility of spring 63 is preferably matched with the weight of reservoir 70 along with the material. The position of the one end of reservoir 70 is measured by optical sensor 63a, and based on this position along the scale included in sensor 63a, calculations may be performed which reflect the volume of the material remaining. This information may then be sent to control panel 267 for a readout of the remaining material volume. Preferably, spring 63 is positioned and its compressibility is such that when fully extended, reservoir 70 is level and the material level is at the level of emergency sensor 82.

As a safety precaution, door 255 may include an interlock (not shown) that is coupled to services board 222, such that if door 255 is opened, printer 40 and heaters 76 are inactivated. It should also be noted that reservoir may be insulated with a two-part foam to protect against burning if touched by the operator. In any event, it is intended that door 255 not be easily removed.

The transfer of material from reservoir 70 to building module 90 is now further described. Reservoir 70 preferably includes pocket 83 which is essentially a trecessed portion in the reservoir floor. It is the material in pocket 83 which is pumped to building module 90. As shown in FIG. 7, heaters 76 may be located in proximity to pocket 83 which represents a relatively small volume of material to heat, thus ensuring that the material about to be pumped to building module 90 is sufficiently flowable. A filter 85 may extend across and over pocket 83 to further ensure that material being pumped to dispenser 94 is free of contaminants. A suitable filter may comprise stainless steel 100 mesh but other filters may be used.

The pumping of material occurs via the vacuum formed by pump 81 which draws material from pocket 83. Pump 81 may include a piston (not shown) which may be powered by motor 81a. Preferably, material is drawn from pocket 83 through a one-way check valve 84 so that material only flows out of reservoir 70. In this manner, when the piston travels away from reservoir 70, check valve 84 opens and allows material to be drawn. When the piston travels towards reservoir 70, check valve 84 closes and a second check valve 84a may open to allow air to escape from pump 81. Additional material is then drawn through valve 84 when the piston travels away. Before entering check valve 84, the material may pass through filter 85'. A preferred filter is a synthetic filtering media such as that manufactured by Gelman Sciences which has pores of about five (5) microns..

Pump 81 provides a volumetric flow of about 0.5 cubic centimeters per stroke. A flow in this range is preferred so that the amount of building material provided to dispenser 94 is neither too much so as to flood dispenser 94, nor too little so as to help avoid forming air bubbles. Pump 81 may be powered by a 24 DC volt motor 81a having a 6:1 ratio such as that manufactured by Halbar Associates.

After leaving pump 81, the material may then travel through line 55 which in turn may enter a bore or other passageway 56 within the reservoir wall as shown in FIGS. 6, 7 and 7a. Passageway 56 as seen in FIG. 7 advantageously maintains the flowability of the building material as the reservoir walls will typically be heated due to conduction of heat provided by heaters 76 through the material in reservoir 70. Thus, additional heaters may be unnecessary at this location. Passageway 57 seen in FIG. 7a may then lead into cavity 58 which may comprise a circular recess in the reservoir wall. Cavity 58 may include filter 59 which ensures that the material is free from contaminants before entering feeder line 72 en route to building module 90 Cavity 58 may also be encapsulated by cover 51 which has a port 53 connected to feeder line 72

Feeder line 72 may extend from reservoir 70 to dispenser 94 of building module 90. Feeder line may comprise a TEFLON tube having an internal heated coil to maintain the flowability of the material as it passes through. It is preferred that feeder line 72 be flexible and resilient to withstand repeated flexing or other movement due to the sweeping motion of dispenser 94. Because of the voltage associated with heating feeder line 72, insulation is preferably placed on its end as a safety precaution. It is preferred that feeder line 72 be maintained at about 125 to 135 degrees Celsius.

For purposes of diversity in object formation capability, material handling module 60 may comprise multiple reservoirs 70 and a plurality of the components supplying material to reservoirs 70 to provide supplies of different materials to building module 90. To this end, multiple feeder lines 72 may extend from material handling module 60 to building module 90. The different materials may have varying properties such as color, rigidity, conductivity and the like so that the object may be customized according to particular needs.

In summary, the material handling module 60 essentially contemplates a three-stage situation where (1) solid material may be stored while waiting to be rendered flowable, e.g., in bottle 66, (2) flowable material is stored awaiting delivery to dispenser 94, e.g., in reservoir 70 and (3) flowable material exists where it awaits dispensing, e.g., in dispenser 94.

As shown in FIG. 15, enclosure 250 may include a door 252 for physical access to receptacle 64 for loading a bottle 66 of material. Door 252 may also include a window (not shown) to provide visual access to bottle 66 and receptacle 64. For aesthetic and/or safety purposes, doors 252, 253 and 255 may themselves all be covered by another door to provide a unitary door appearance and protection against hot temperatures. As an alternative, material handling module 90 may be coupled to a slide mechanism (not shown) which is in turn coupled to base 42 so that module 60 may be slid forward out of enclosure 250 to facilitate servicing or other inspection.

Referring now to FIGS. 1a–d and 8–11, building module 90 is now further described. As shown in FIG. 1c. feeder line 72 extends from material loading module 60 to building module 90 at which point feeder line 72 enters dispenser 94. In a preferred embodiment, dispenser 94 comprises an ink jet print head as discussed in more detail later. To accommodate different building materials, dispenser 94 may have multiple ports (not shown) to receive multiple feeder lines 72 from material handling module 60.

Dispenser 94 may be attached to X-stage 96 and moves back and forth over platform 92 during which it dispenses material to form successive layers of the object. The X, Y and Z stages referred to earlier are now described in more detail with reference to FIGS. 8, 9 and 10 respectively.

X-stage 96 may generally comprise belt drive system 104 which provides the reciprocating sweeping movement of dispenser 94 across platform 92. Dispenser 94 may be attached to belt drive system 104 via plate 106. X-stage 96 may be mounted to surface 56 of backbone 52 via rails 120, or alternatively, some other type of mount (not shown). As shown, one end of belt 110 is coupled to motor 112 while the other end is fitted around pulley 114. Plate 106, and thus dispenser 94, may be attached to belt 110 via brackets 116. Slide bearings 118, which are also mounted to plate 106, slide along rails 120 to provide precise linear movement in the X-direction. A preferred slide bearing 118 is model no.

LXPB-1018-125A as manufactured by LM 76, Inc. and a preferred rail 120 is that such as manufactured by Thompson, Inc. A preferred motor 112 is Dynetic Systems model no. MS 3130.

In operation, motor 112 preferably provides rapid acceleration and deceleration at either end of dispenser's 94 travel. Motor 112 and its direct drive pulley 113 coupled to belt 114 rotate in one direction to provide a sweep of dispenser 94 over platform 92 until the other end of X-stage 96 is reached. Motor 112 then rotates the other direction to provide a return sweep. This process reciprocates for successive sweeps.

A preferred velocity of dispenser 94 along X-stage 96 is about 33 cm/sec. This represents a sufficiently large velocity so that material is dispensed quickly enough to provide reasonable build times. However, this also represents a small enough velocity so that the associated accelerations and decelerations of dispenser 94 occurring at either end of X-stage 96 are not so large as to cause significant inertial forces. Such inertial forces are preferably avoided because if they are not sufficiently dampened, they could impact dispensing and object accuracy. Where dispenser 94 comprises an ink jet print head, the velocity of about 33 cm/sec. also represents a slow enough sweep velocity such that about 1200 drops of material per inch, i.e., 472 drops per centimeter, may be dispensed.

It is also preferred that X-stage 96 move platform 92 with a resolution of 300 counts per inch, i.e., 300 pixels per inch or 118 pixels per centimeter as described later, such that 4× overprinting results in 1200 drops per inch, i.e., 472 drops per centimeter. To this end, X-stage 96 may include encoder 121 which may comprise an etched mylar strip, and encoder reader 122 which provides position information to DSP 204 as shown in FIG. 2 for adjustment purposes. Where dispenser 94 comprises an ink jet print head, the firing of the ink jets is based on the position information from encoder reader 122. As discussed in more detail later, material is dispensed from dispenser 94 in both directions of travel along X-stage 96.

Figure 1B:
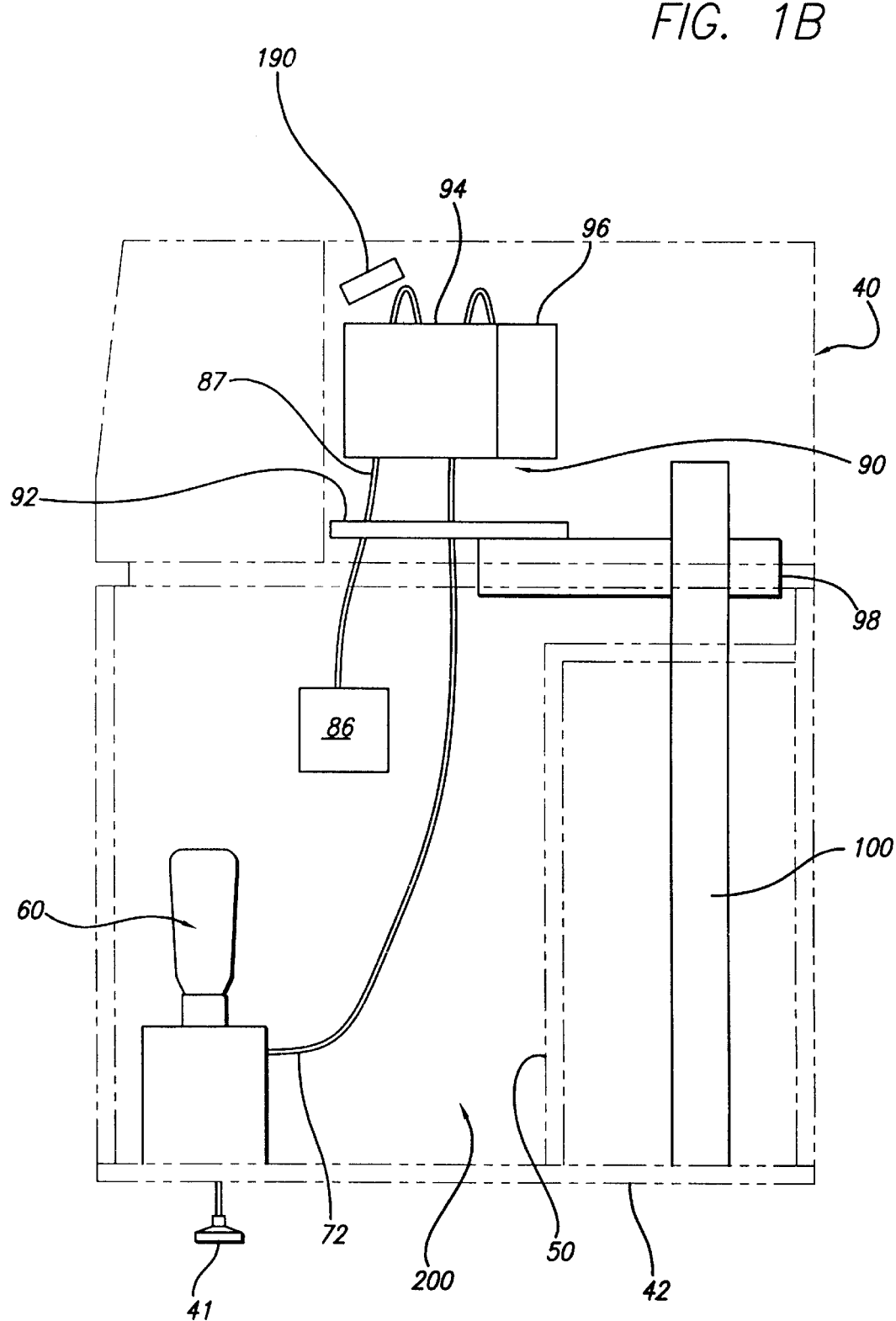
FIG. 1b is a side view of an overall system.
Figure 9:
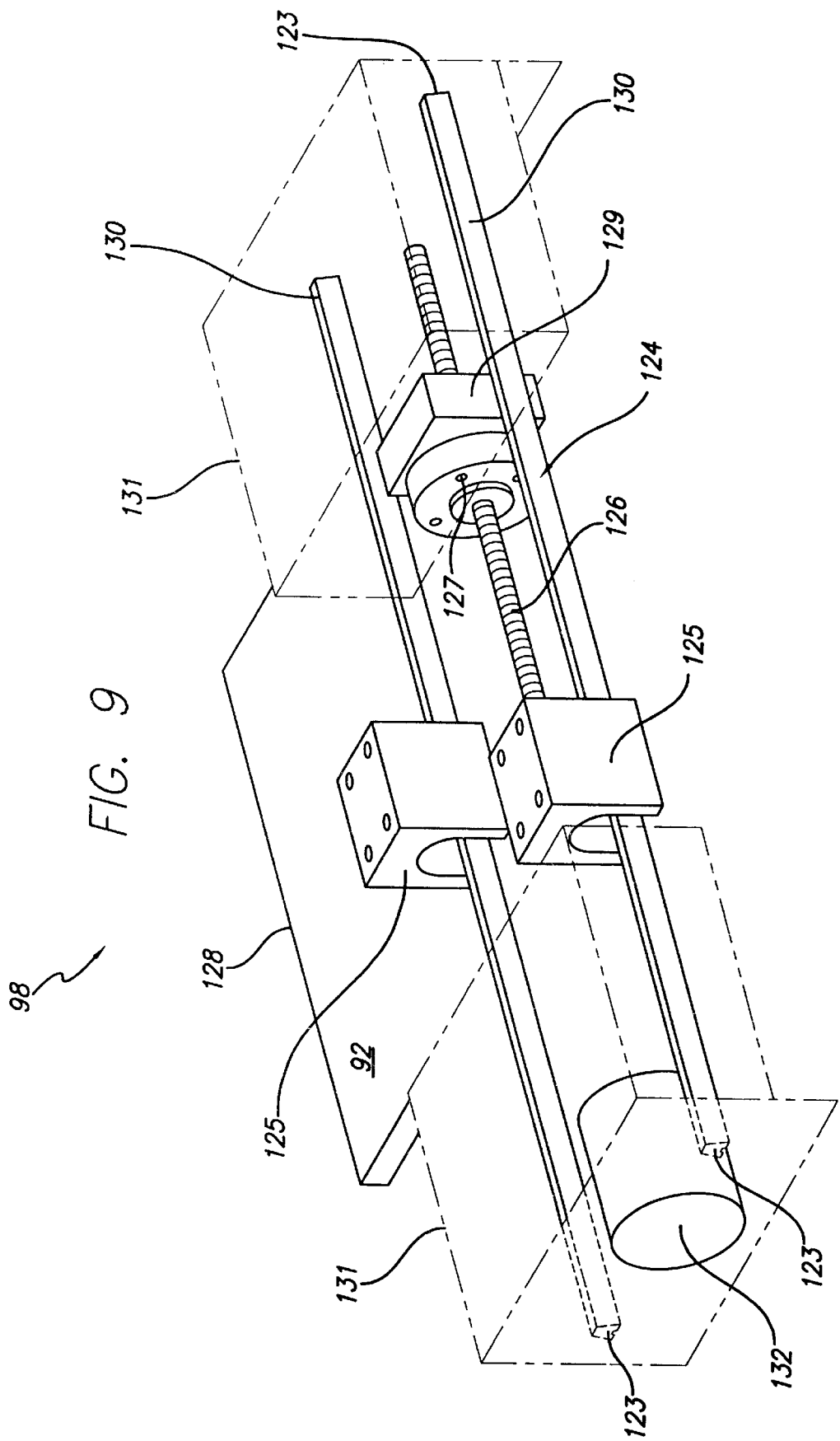
FIG. 9 shows a Y-stage.

Referring now to FIG. 9, Y-stage 98 is now described. Y-stage 98 may be mounted to Z-stage 100 via rail mounts 123. This mounting arrangement is shown in FIGS. 1b and 1c. Platform 92 (not shown in FIG. 9) may be mounted to Y-stage 98 on slide 128. Thus the vertical movement of Z-stage 100 also effects Z-direction movement of Y-stage 98 and platform 92. As mentioned above, Y-stage 98 serves to move platform 92 an incremental distance in the direction perpendicular or transverse to the X-direction each time dispenser 94 reaches either end of its movement along X-stage 96. This provides that on the next sweep of dispenser 94, material will be deposited on an adjacent area of that layer or other portion of that layer onto which material has not yet been dispensed.

As shown in FIG. 9, Y-stage 98 may include a ball screw system 124 of the type manufactured by Nook, Inc. Ball screw 124 may include screw 126 which threadably engages nut 127. Screw 126 may be coupled to motor 132 via direct drive and nut 127 may be coupled to slide 128 via nut block 129. To effect Y-direction movement of slide 128 along rails 130, screw 126 is rotated by motor 132. Because nut 127 does not rotate, the pitch of the threads on screw 126 effects linear movement of nut 127 which in turn effects linear movement of nut block 129, slide 128 and thus platform 92. Slide 128 may also be coupled to guide blocks 125 which slide along rails 130 to provide smooth motion of platform 92.

It is preferred that Y-stage 98 moves platform 92 the desired transverse distance and then settles when dispenser 94 reaches either end of X-stage 96 and before dispenser 94 begins its next sweep along X-stage 96. It is preferred that motor 132 provides rotation such that slide 128, and thus platform 92, may travel at 1.57 cm/sec. with an acceleration of 0.3 g.

It is also preferred that motor 132 provide rotational accuracy so that Y-direction movement has a resolution of 0.000254 cm. To this end, Y-stage 98 may include encoder 134 and read head 135 which provides position information to DSP 204 as shown in FIG. 2 for adjustment purposes. Encoder 134 may comprise an etched glass scale such that when the light from read head 135 shines on an etch, a positioning signal is sent to DSP 204. Preferably, Y-stage 98 is configured so that it may travel about 22.86 cm in the Y-direction so that printer 40 may build objects of various transverse dimensions.

Y-stage 98 may also include bellows 131 which serve to cover many of the moving and other parts of Y-stage 98 to prevent them from being contaminated by building material, dirt or other foreign substances. Bellows 131 are preferably flexible but resilient to withstand repeated movement of slide 128.

Figure 10:
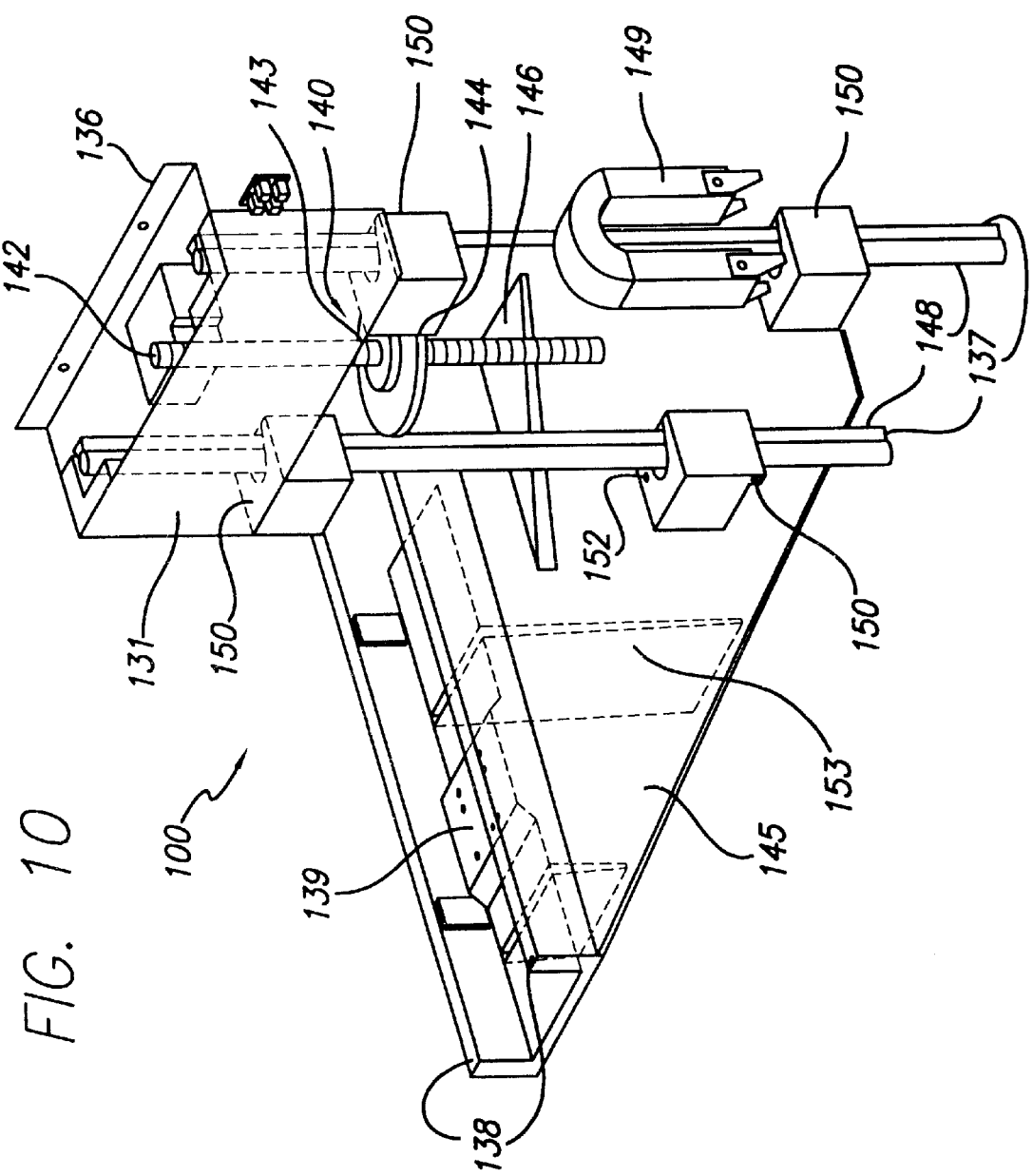
FIG. 10 shows a Z-stage.

Referring now to FIG. 10, Z-stage 100 is now described. As mentioned above, Z-stage 100 is lowered relative to dispenser 94 an incremental distance after each layer is deposited. The incremental distance may be one layer thickness which may be in the range of approximately 1.2–1.5 mils, i.e., 0.003–0.004 cm, but may also be larger. It is preferred that Z-stage moves and settles before dispenser 94 makes its next sweeps along X-stage 96. After the object is completed, Z-stage 100 may raise platform 92 to its original position. At other appropriate times, Z-stage 100 may also move platform 92 to a "store" position which is away from dispenser 94 so that dispenser 94 may be easily inspected. Z-stage 100 may be mounted to backbone 50 via bracket 136 and rail spacers 137. Y-stage rail mounts 123 may be mounted to Z-stage 100 on mounting surfaces 138 and ball screw system 124 of Y-stage 98 may be mounted to Z-stage surface 139.

Z-stage 100 may include acme screw system 140 wherein screw 142 threadably engages nut 143 which is coupled to motor 146. Motor 146 is coupled to slide 144 which includes flange 145 which in turn supports Y-stage 98. In this arrangement, screw 142 may not rotate and may remain stationary. However, nut 143 may be rotated by motor 146 and the pitch of the threads effects Z-direction movement of nut 143 which moves motor 146 up or down. This in turn effects linear movement of slide 144, Y-stage 98 and platform 92. A preferred motor 146 is model no. LA42BLKL-300 manufactured by Eastern Air Devices, Inc. Z-stage 100 may include bellows 147 to protect the moving and other parts from contamination. Z-stage 100 may also include rolling loop 149 which may accommodate the vertical movement of Z-stage 100 and which may serve as a cable guide.

Z-stage 100 may include rails 148 along which bearings 150 slide. Bearings may be mounted to slide 144 and thus help guide the vertical movement of Z-stage 100. Preferably, Z-stage 100 may be linearly moved at a velocity of about 0.381 cm/sec. and a resolution of 0.000254 cm. For accuracy purposes, Z-stage 100 may also include encoder 152 which may comprise etched glass and read head 153 which provides position information to DSP 204 as shown in FIG. 2 for adjustment of Z-stage motion. Z-stage may also be capable of moving an overall amount about 22.86 cm which allows printer 40 to build objects of varying heights.

The dispensing of material to form the object is now discussed in more detail with reference to FIGS. 1*a*–1*d* and 11–13. Generally, it is preferred that the object be rapidly built. To this end, it may be preferred to have dispenser 94 sweep along X-stage 96 only as far as the boundaries of the object to be formed rather than sweeping the entire length of X-stage 96. In any event, building preferably occurs so that the object replicates the geometry of the original data, e.g., CAD data, as accurately as desired. It is also preferred that the resulting object is aesthetically pleasing with a minimum of surface blemishes and irregularities. In any event, building speed may be varied according to the accuracy desired.

Dispenser 94 may comprise various embodiments. A preferred embodiment which is described in more detail below is a modified ink jet print head 102. Alternatives include nozzles, single and multiple orifice dispensers and other types of feed systems which are capable of dispensing flowable material. It if preferred that any alternative for dispenser 94 be capable of selectively dispensing material under computer control.

Figure 11:
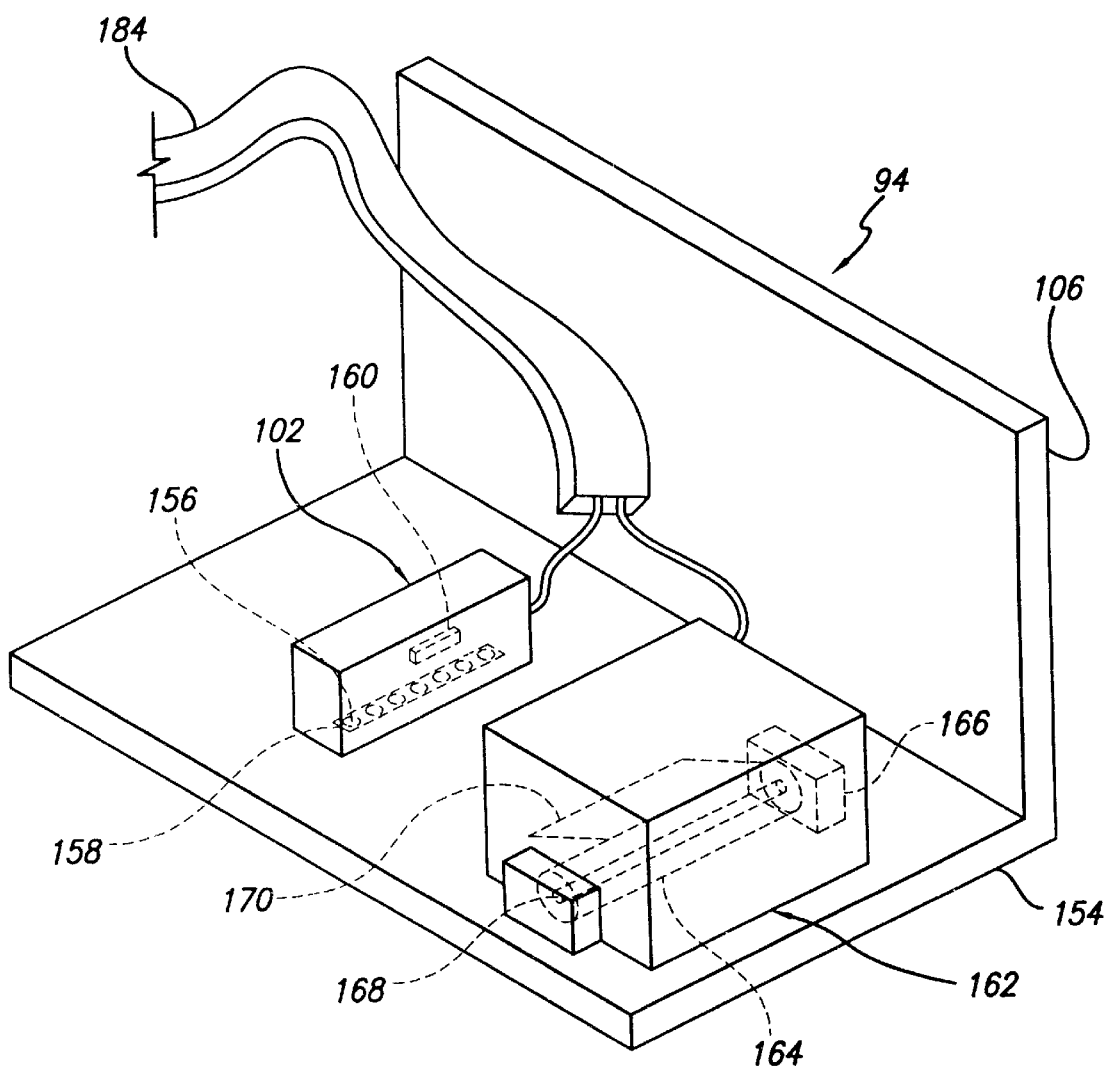
FIG. 11 shows a dispenser.

One embodiment of dispenser 94 is shown in FIG. 11 in which dispenser 94 is coupled to X-stage 96 via plate 106. In this embodiment, dispenser 94 includes dispensing platform 154 on which is mounted an ink jet print head 102. A preferred wave causes a drop of material to be emitted from the orifice 156. As shown in FIG. 2, the electric firing pulses to print head 102 (206*a* in FIG. 2) are provided by head driver board 206 which in turn may be coupled to DSP 204 and control computer 26. This control mechanism provides signals dictating the rate and timing of the firing pulses applied to the individual orifices 156. Material may be dispensed from orifices 156 in each direction of dispenser's 102 movement along X-stage 96.

Because each droplet will have an X-direction component of velocity as it travels from print head 102 towards platform 92 or the prior layer on which it will land, the signal causing the emission of a droplet may be provided to orifice 156 before the desired landing location is actually reached. This "pre-firing" provides correction for the droplet's time of flight and thus enhances object building accuracy. This pre-firing capability may be provided by software, i.e., software which receives position information from Y-encoder 121 and X-encoder reader 122.

The array of orifices 156 are generally maintained at a temperature of about 120 to 130 degrees Celsius so that the material being dispensed remains flowable to avoid clogging which might otherwise occur. Heaters 160 may be included in proximity to orifices 156 as well as the back end of print head 102 for this purpose. Building module 90, i.e., the area around the platform is generally maintained at ambient temperature, e.g., about 25 degrees Celsius, so that the material begins to solidify or otherwise physically transform upon being dispensed.

Figure 11A:
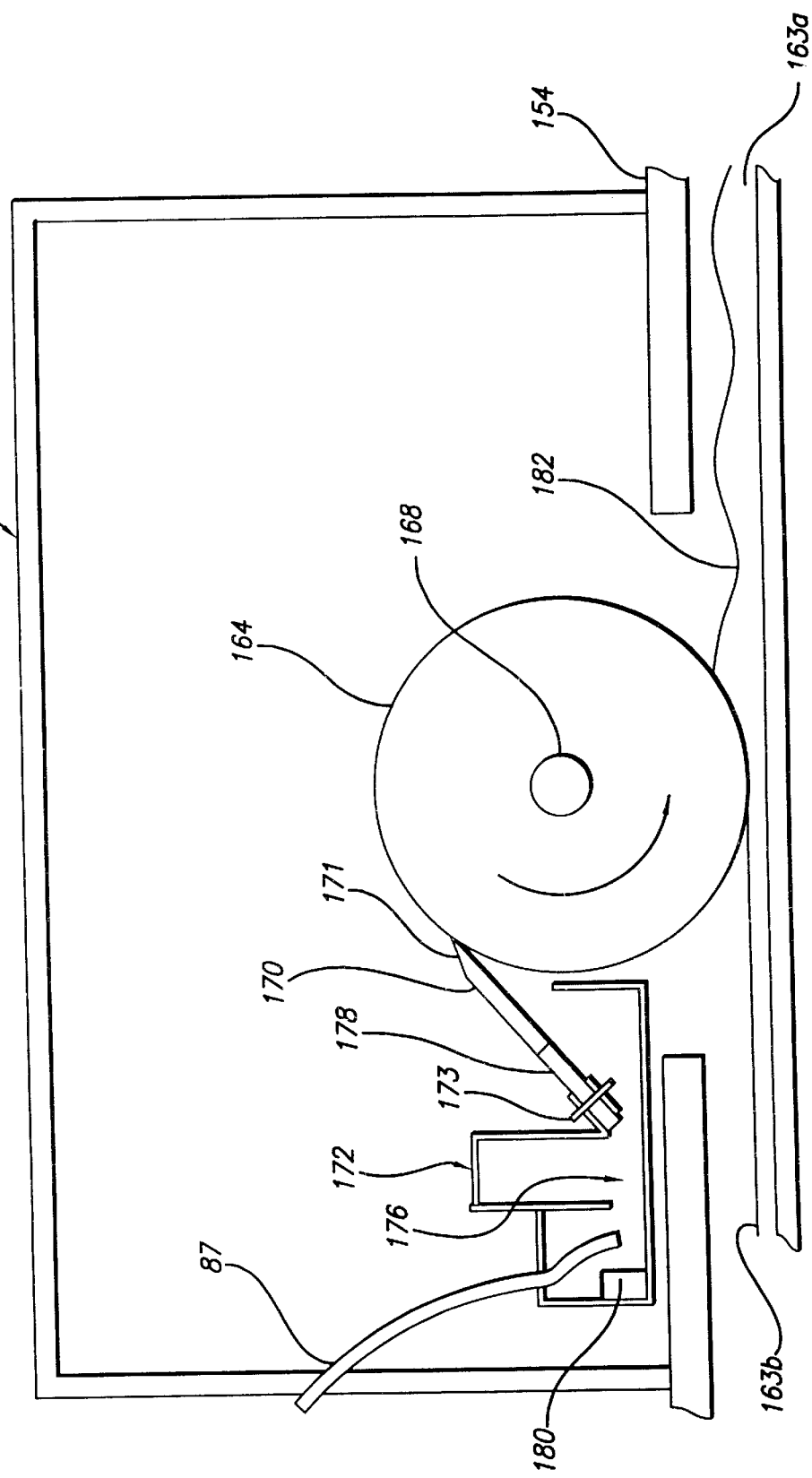
FIG. 11a is a side section view of a dispenser.

Advantageously mounted to dispenser platform 154 is planarizer 162, which is shown in more detail in FIG. 11*a*. Planarizer 162 may serves to remove and smooth the material just deposited by dispenser 94 by (a) removing and transporting away any unwanted or excess material and or (b) by filling in or providing material to portions of the just dispensed layer which are deficient in material. In this manner, planarizer 162 may form layers of desired thicknesses. The reason why this material needs to be removed and smoothed is because dispensed droplets from orifices 156 or from an alternative dispenser 94 are typically nonuniform in droplet volume. Furthermore, the droplets may be deposited and/or flow upon impacting the prior layer in nonuniform fashion thereby resulting in a bumpy or otherwise uneven layer comprising excessively thick and thin portions.

Planarizer 162 may thus serve the purpose of essentially eliminating or otherwise reducing any nonuniformity in just-dispensed layers. This is preferred because the smoothing of layers to the desired thickness and uniformity serves to maintain the accuracy of the layer as well as the overall object.

The smoothing function of planarizer 162 is also preferred because it may also provide an acceptable "working surface" on which the next layer may be dispensed. That is, after a layer is dispensed, its surface serves as the foundation, i.e., working surface, on which the next layer will be dispensed. Accordingly, its preferred that this surface be smooth and at the desired level and uniformity so that formation of the next layers begins on a foundation that will lead to a subsequent layer that is within the intended dimensional accuracy.

For example, if the just-dispensed layer were too thick or thin, the surface of the layer, i.e., working surface, would not be at the correct level. The subsequent layer would then not be dispensed at the correct vertical location which could compromise accuracy. Planarizer 162 may avoid this problem by smoothing the just-dispensed layer so that it is of the desired thickness so that its surface is at the correct level thereby forming an appropriate working surface.

FIG. 11*a* shows a just-dispensed layer 163*a* which reflects a nonuniform layer thickness, and smoothed layer 163*b* which shows the effects of planarizer 162. Planarizer 162 may accomplish this layer-smoothing function by first melting any unwanted surface portions of just-dispensed layer 163*a* via contact with heated cylinder 164 and then transporting this melted material away. Planarizer 162 may be used in connection with print head 102 or any other type of dispenser 94 and helps maintain the accuracy of each layer 163*b* and the overall object being built. Planarizer 162 thus also provides successive working surfaces 163*c*.

Heated cylinder 164 may be heated by heater 168 which may be positioned axially within cylinder 164 and which may provide radial heating. Suitable heaters are cartridge heaters such as those manufactured by Watlow, Inc. Alternatively, heater 168 may be located externally to cylinder 164 but within planarizer 162. To facilitate heat transfer from heater 168 to the just-dispensed layer 163*a*, cylinder 164 preferably comprises aluminum or other thermally conductive material. Because the temperature of the just-dispensed material is typically at about its gel point, i.e., about 50–70 degrees Celsius, it is preferred that cylinder 164 be heated to about 85 or more degrees Celsius to ensure quick melting.

Cylinder 164 may be rotated by a motor 166 which is preferably a direct drive but may be driven by a pulleylbelt arrangement. Motor 166 may be controlled by services board 222 as shown in FIG. 2. Cylinder 164 may have a diameter of about 3.55 cm but other diameters may be used.

As shown, cylinder 164 may be positioned so that its lowest point in the Z-direction projects downward from the bottom of dispensing platform 154 enough to contact and melt the unwanted portions of the just-dispensed layer 163*a*. The amount by which cylinder 164 protrudes from the bottom of dispenser platform 158 is preferably adjustable so that varying amounts of unwanted material may be melted and so that the time of flight of droplets dispensed from print head 102 may be varied. In any event, it is preferred that cylinder 164 not protrude too much below dispenser platform 154. Otherwise, degradation of droplets during their flight from orifices 156 might occur due to the increased distance the material has to travel.

The surface of cylinder 164 may be smooth, or alternatively, the surface may include a diamond knurling or other textured surface to facilitate removing the melted material from just-dispensed layer 163a. Other surfaces for cylinder 164 may include longitudinal grooves, flutes, threads or circular grooves. Another alternative is to coat the surface with sand or some other media.

The direction of rotation of cylinder 164, i.e., the direction of its tangential velocity, may be counter to the direction of travel of dispenser 94 or may be in the same direction. To this end, the direction of rotation of cylinder 164 may or may not be alternated each time dispenser 94 reaches an end of X-stage 96. In this manner, the direction of rotation may always remain counter to the direction of travel of dispenser 94, always remain in the same direction of dispenser 94 travel or alternate between counter and in the same direction. The preferred direction of rotation however, may be somewhat dependent on the location of wiper 170 as discussed later.

When the building material used is a preferred thermal stereolithography polymer as described in application U.S. Pat. No. 5,855,836, it is preferred that cylinder 164 rotates at a speed in the range of about 500 to 2000 rpm. Because at that speed the tangential velocity of cylinder 164 is sufficient to transport away the melted excess material. However, it is also preferred that the rotational velocity of cylinder 164 be capable of being varied to accommodate different types of building materials and/or different scan speeds of dispenser 94 along X-stage 96.

It can be seen that the tangential velocity of cylinder 164 is typically much higher than the linear velocity of dispenser 94 as dispenser 94 moves along X-stage 96. Consequently, cylinder 164 will have sufficient tangential velocity relative to the surface of just-dispensed layer 163a regardless of whether the direction of cylinder 164 rotation is counter to or the same as the direction of dispenser 94. And it has been found that acceptable smoothed layers 163b result when cylinder 164 rotates in either direction. Accordingly, it is not necessarily required that the direction of cylinder 164 rotation be alternated at the end of each sweep of dispenser 94.

The excess material melted by cylinder 164 may generally adhere to cylinder 164 via surface tension. However, it is preferable to avoid a boundary layer of print head is a modified version of the 96 Jet Spectra Commercial Printhead, model no. HDS 96i, manufactured by Spectra, Inc. of Nashua, N.H.

Generally, print head 102 receives flowable material from feeder line 72. Print head 102 then selectively emits droplets of the flowable material through a plurality of orifices 156 which are arranged in orifice plate 158 on the bottom of print head 102. This selective emission of droplets preferably occurs under computer control based on signals received from DSP 204 which signals were based on location signals from encoder reader 122 of X-stage 96.

To accommodate multiple building materials, print head 102 may include a plurality of ports (not shown) to receive multiple incoming feeder lines 72 that may supply different materials through different orifices 156. Alternatively, multiple print heads 102 may each be connected to individual feeder lines 72 wherein the various print heads may each be used to supply a different material. To accommodate the X-direction movement of print head(s) 102, feeder line(s) 72 preferably have sufficient length and resiliency to withstand repeated flexing as print head(s) 102 dispense material. After feeder line(s) 72 enter print head(s) 102 suitable individual feeder lines (not shown) emanate out to each individual orifice 156.

Orifice plate 158 may be mounted approximately perpendicular to the X-direction and may include 96 individual orifices 156 with a spacing of about 0.0677 cm, i.e., about 26.67 mils. Accordingly, the length of orifice plate 158 is about 6.553 cm. Orifice plate 158 may be located so that it protrudes slightly from the bottom of dispenser platform 154. Print head 102 is preferably capable of depositing droplets of material at resolutions of about 300 drops per inch (DPI) (118 drops/cm), 600 DPI (236 DPC) and 1,200 DPI (472 DPC) which provides for varying resolutions in building styles and varying building speeds.

Each orifice 156 may be equipped with a piezoelectric crystal which emits a pressure wave when an electric firing pulse is applied to the crystal. The pressure material from forming on cylinder 164, which boundary layer could serve to recoat or otherwise distort the just-smoothed layer 163b. To this end, it is advantageous to remove the flowable material from cylinder 164 by wiper 170 which may be located in planarizer 162.

Wiper 170 preferably contacts cylinder 164 on a continuous basis. Moreover, the tip of wiper 170 preferably has a beveled edge 171 which is positioned in a direction counter to the direction of cylinder 164 rotation. Accordingly, because adequately smooth layers 163b result from either direction of cylinder 164 rotation, it is preferred that cylinder 164 rotation remain in one direction so that beveled edge 171 is always counter to that rotation. Alternatively, wipers 170 on either side of cylinder 164 might be used but this may reduce the neatness in which melted material is transported away.

Figure 11B:
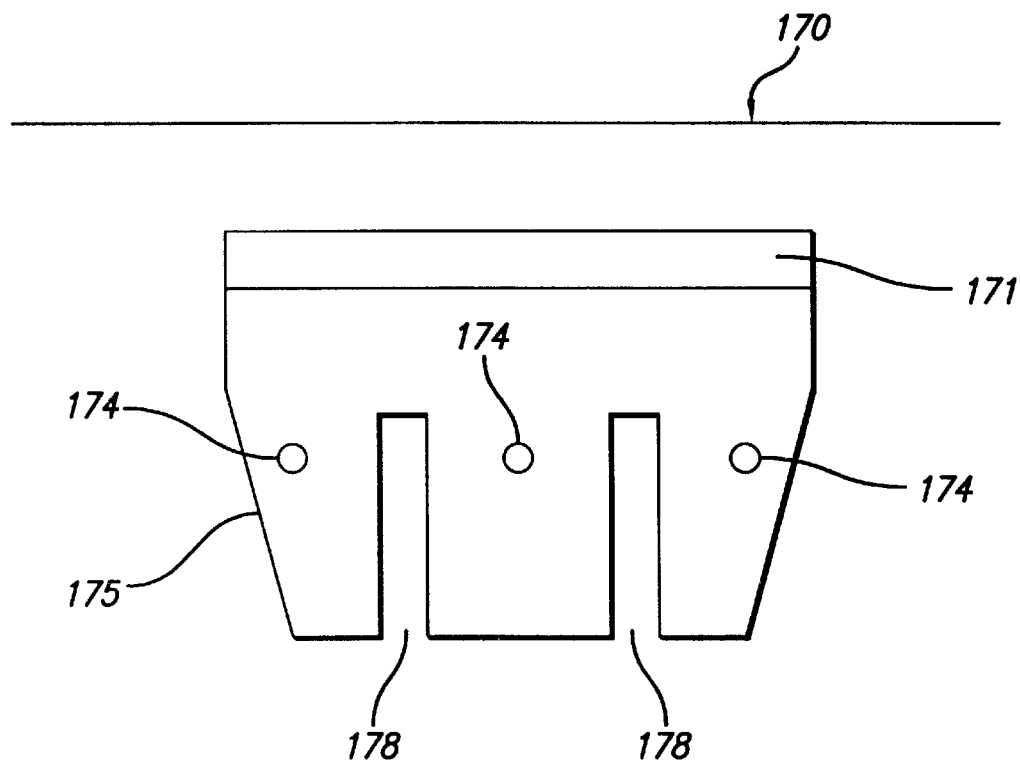
FIG. 11b shows a wiper.

Wiper 170 preferably comprises VITON which is resilient, but alternative wiper 170 materials may be TEFLON and NEOPRENE. To provide that edge 171 remains in contact with cylinder 164, bracket 172 may position wiper 170 so that it is pressing down or cylinder 164, with the resiliency of wiper 170 also helping to keep edge 171 in place. As shown in FIGS. 11a and 11b, wiper 170 may be attached to bracket 172 via screw 173 which may extend through mounting holes 174. The angle between wiper 170 and the tangent of cylinder 164 at the point of contact with wiper 170 may be about 25 degrees. However, wiper 170 may be positioned at other angles as well.

As cylinder 164 rotates, the material adhering thereto is removed by wiper 170 and flows down into collection trough 176. It has been seen that most of the material flows down wiper 170 on its upper side but some material may also flow into trough 176 via the under side. In any event, to avoid material being sprayed back onto layer 163b, it is preferred that trough 174 extend so that it is relatively close to cylinder 164 as shown in FIG. 11a.

Wiper 170 may include angled edges 175 as shown in FIG. 11b so that material falling off its edges will be well within trough 176 to avoid spilling back onto smoothed layer 163. Wiper 170 may also include slots 176 through which material may drain into trough 176 as it flows down wiper 170.

The material reaching trough 176 is preferably kept flowable by one or more trough heaters 180. This facilitates the transportation of this material away by vacuum collection line 87 which as described before may extend back to waste collection reservoir 85 in material handling module 60 as shown in FIGS. 1c, 1d and 5. To further facilitate this transportation, the interior of trough 176 may be angled towards the point where vacuum collection line 87 sucks in material so that gravity eases transportation. Similar to feeder line 72 extending from reservoir 70 to dispenser 94, feeder line 87 may be heated by a coil extending through the cylindrical walls comprising line 87.

As shown in FIG. 11, wiper 170 may be positioned so that its length is generally parallel to the axis of cylinder 164, but alternatively, wiper 170 may be positioned at an angle relative to the cylinder 164 axis. As also shown in FIG. 11a, wiper 170 may generally be positioned near the top or high-point of cylinder 164. Alternatively, wiper 170 may be positioned to the left, e.g., 9 o'clock, of the position shown in FIG. 11a so that gravity helps direct the material adhering to cylinder 164 to wiper 170. Wiper 170 may also be positioned at other locations around the circumference of cylinder 164.

It should also be noted that the melting action provided by cylinder 164 may also serve to "fill in" portions of the just-dispensed layer 163a that received less than the desired amount of material. That is, just as some portions of the just-dispensed layer may be too thick, other areas may be too thin, e.g., portion 182 in FIG. 11a. As mentioned above, this may happen because orifices 158 may misfire from time to time or emit a small amount of material. Accordingly, the excess material melted by cylinder 164 may flow into these deficient areas before being removed by the knurled surface and surface tension of cylinder 164.

Dispenser 94 may also include rolling loop 184 as shown in FIG. 11 which serves as a guide for all the cables that operate print head 102 or other device which dispenses material, planarizer 162 and any other components comprising dispenser 94. Rolling loop 184 preferably comprises a flexible but resilient material to withstand the repeated sweeps along X-stage 96.

With respect to the material that is removed from just-dispensed layer 163a by planarizer 162, upon reaching waste reservoir 86, the material may be collected for disposal. To this end, it is preferred that collection reservoir be easily removable from printer 40 through door 253 as shown in FIG. 15, for disposal or emptying. In this manner a new or emptied collection reservoir 86 may be put in its place. For safety purposes, collection reservoir 86 may be insulated by a two-part foam and door 253 may be secured by an interlock to prevent its being opened until it has sufficiently cooled.

Alternatively, the collected material may be recycled by extending a feeder line (not shown) from collection reservoir 86 to reservoir 70 in material handling module 60 for reuse. This recycling process may be facilitated by heaters and filters (not shown) in proximity to collection reservoir 86 and along the appropriate feeder lines between collection reservoir 86 and reservoir 70 to maintain the flowability of the material as well as its purity. Also, collection reservoir 86 may be directed under computer control to release collected material back to reservoir 70 when the material level therein falls below the desired minimum as a supplement to sensors 80 and 82.

Additional alternative aspects regarding planarizer 162 are now described. To help keep wiper 170 in place against cylinder 164, bracket 172 may include a spring (not shown) which may exert a downward force on wiper 170. Also, instead of using trough 176, cylinder 164 may alternatively be rotated at a higher rate at either end of its sweeps along X-stage 96 so that material clinging thereon is flung off.

As an alternative to cylinder 164, planarizer 162 may include a blade, e.g., knife blade, (not shown) that sweeps over the just-dispensed material. The blade may be heated by cartridge or other types of heaters so that it melts any excess material for removal and/or spreading of material to fill in deficient portions of the just-dispensed layer. As a further alternative, a hot wire (not shown) may be used to sweep across the just-dispensed material to accomplish the melting, removal and spreading functions.

As an alternative to wiper 170, the material melted by the blade, hot wire or other means used may be removed therefrom by a vacuum. That is, a vacuum line (not shown) having an opening in proximity to the blade or wire may serve to suck off the material adhering thereto. For example, line 87 in FIG. 11a may be positioned so that its end is close to the blade or hot wire. to provide a vacuum force over the length of the blade or wire, Line 87 may also have a rectangular opening extending across the blade or wire.

Another alternative to wiper 170 involves heating the blade or wipe, (or cylinder 164) to a temperature such that material which is melted thereby, undergoes a phase change such that it vaporizes. That is, the material melted by the blade, wiper or cylinder 164 may undergo a solid to liquid to gas phase change, or sublimation from a solid directly to a gaseous phase. This vaporized material could then be sucked up by an appropriate vacuum, directed away from the just-dispensed layer by appropriately placed fans, or allowed to dissipate.

Material removal by vaporization may also provide a cooling effect to the just-dispensed layer. That is, the just-dispensed material is typically hot so by vaporizing it and directing it away from the just-dispensed layer, the overall amount of heat in proximity thereto is reduced. Such cooling is advantageous because it may provide a solid working surface more quickly in anticipation of the next layer being dispensed thereon. It is contemplated that any of the foregoing alternatives may be used with each other.

The process of forming an object is now further discussed. After the operator has input the building parameters such as through control panel 267 as discussed above, and where dispenser 94 includes print head 102, Z-stage 100 is commanded to position platform 92 near orifices 156 of print head 102. To this end, the surface of platform 92 may be positioned about 0.102 cm below orifices 156 at this time and twenty seven initial layers of material may be dispensed thereon by reciprocating motion of dispenser 94 along X-stage 96 to form a buffer between platform 92 and the actual object. The layers comprising the actual object may then be dispensed.

These initial layers may be dispensed to facilitate removal of the object from platform 92 when building is complete. Such initial layers may also avoid damage to the object surface which rests directly on platform 92, which damage might otherwise occur when removing the object from platform 92. Subsequently, these initial layers may be removed from the object via post-processing such as a melting or sanding process or the like.

Alternatively, the initial layer dispensed on platform 92 may comprise part of the object. To this end, it is preferred that the building material used to form the object will not substantially adhere to platform 92 thereby allowing easy removal. Such building materials are discussed in concurrently-filed application U.S. Pat. No. 5,855,836, previously incorporated by reference herein. As a further alternative, some type of spacer or other supplemental platform (not shown) may be located on platform 92 at the location on which the object will be built, and the layers dispensed onto it.

Figure 12:
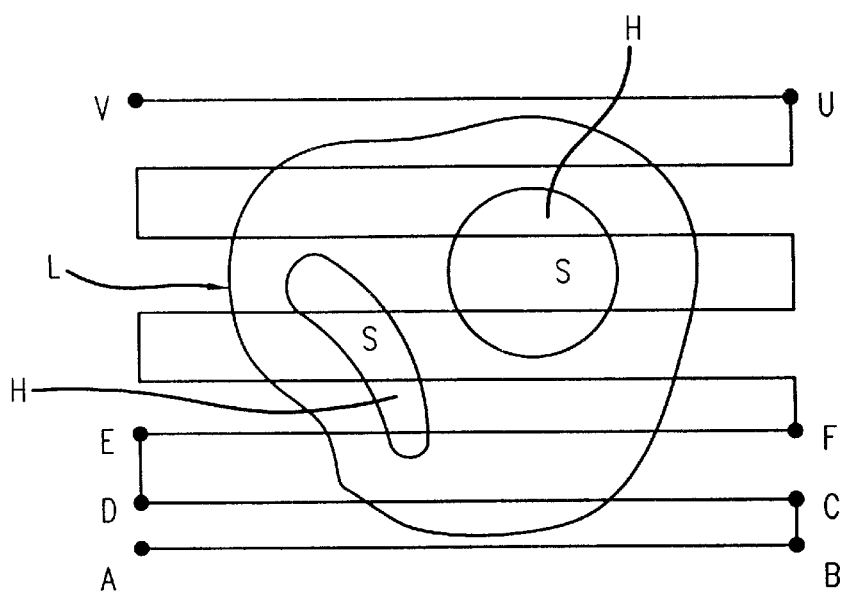
FIG. 12 shows a dispensing path for a dispenser.

The dispensing of a layer is now further described with reference to FIG. 12 which shows a sample layer L which includes holes H. FIG. 12 also shows dispenser's 94 path of travel over platform 92 when dispensing layer L. To dispense a layer, dispenser 94 is commanded to traverse back and forth across X-stage 96 so that it dispenses material and planarizer 162 smooth the just-dispensed layers 163a to form layers 163b of desired thickness.

As shown in FIG. 12, after the first X-direction pass from A to B, Y-stage 98 moves an incremental distance, from B to C, so that on the return sweep from C to D, dispenser 94 dispenses material over the adjacent transverse portion of the layer. As described in concurrently-filed applications U.S. Pat. No. 5,943,235, previously incorporated by reference herein, the amount of movement provided by Y-stage 98 may be varied according to the desired building style. As mentioned above, dispenser 94 may generally travel at about 33.02 cm/sec., and Y-stage 98 moves platform 92 to the next transverse position at sufficient acceleration, velocity and deceleration so that platform 92 is essentially "settled" when dispenser 94 begins its next sweep along X-stage 96.

As mentioned above, the positions of dispenser 94 along X-stage 96 and of platform 92 along Y-stage 98 and Z-stage 100 may be controlled by encoders and read heads as shown in FIGS. 2 and 8–10. Generally, these read heads optically measure the respective positions, and the actual physical location is then compared against the desired location as per the computer file describing the building of the object. Appropriate correction signals may then be sent to adjust the physical positions of X-stage 96, Y-stage 98 and Z-stage 100.

Where the layer is not continuous such as where holes H exist, it should be noted that during various sweeps such as from E to F, material will not be dispensed at those locations. Furthermore, material may be dispensed at locations S which may serve as supports for successive layers. Techniques for the dispensing of supports is described in concurrently-filed and continued U.S. Ser. No. 09/252,512, previously incorporated by reference herein.

Eventually, dispenser 94 dispenses material to all locations containing the cross-sectional area that comprises that layer. After the last X-direction sweep, e.g., from U to V, Z-stage 100 moves platform 92 downward by a distance approximating the desired layer thickness. Similar to Y-stage 98 movement, Z-stage 100 movement of platform 92 preferably occurs quickly enough so that dispenser 94 need not wait for platform lowering and so that platform 92 is "settled" before beginning dispensing of the next layer. The dispensing process described above is then repeated for the next layer.

It should also be noted that instead of moving platform 92 downward after each layer being dispensed, dispenser 94 may instead be moved upward while platform 92 remains stationary between layers. In this alternative, Z-stage 100 may be attached to dispenser 94 instead of platform 92 so that the movement of dispenser 94 is accurately controlled. As a further alternative, instead of moving platform 92 in the transverse direction by Y-stage 98, dispenser 94 may also be moved in the Y-direction while platform 92 remains stationary. In this alternative, Y-stage 98 may be attached to dispenser 94 instead of platform 92.

As mentioned above, the space surrounding platform 92 is maintained at about ambient temperature, e.g., 25 degrees Celsius, so that the just-dispensed layer, including any supports S, may solidify or otherwise physically transform to provide a base for the next layer. Upon being dispensed, the next layer also preferably solidifies or otherwise physically transforms and also adheres to the prior layer. It is preferred that each layer solidify or otherwise physically transform quickly because this may reduce the overall time required to build the object. Various means to effect solidification or other physical transformation of a just-dispensed layer are now described.

The environment around platform 92 may be maintained at 25 degrees Celsius or other desired temperature by one or more cooling fans 190 as shown in FIG. 1b which may be mounted in proximity to platform 92. Such cooling fans 190 may be mounted onto platform 92 or onto a portion of backbone 50 which is near platform 92. Alternatively, cooling fans 190 may be mounted to the underside of dispenser platform 154 so that fans 190 pass over the just-dispensed layer to provide "forced air" cooling. With respect to the dispenser 94 of FIG. 11 including print head 102 and planarizer 162, fans 190 may also be mounted on dispenser platform 154 therebetween or on either or both sides thereof.

Ducts (not shown) may also be mounted in proximity to platform 92 to receive and transport away the heated air which is pushed aside by cooling fans 190. It is preferred that any fans so used provide a stream of cooling air which is not so forceful as to disrupt the material just dispensed.

In addition to cooling fans 190, an insulating shield (not shown) may be positioned around the area surrounding platform 92 so that heat generated from other portions of printer 40, e.g., material loading module 60 or heaters 160, 168 and 180 of dispenser 94, do not impinge on just-dispensed layers. Such a shield may include duct openings to receive heat generated from the just-dispensed material.

To further facilitate solidification of just-dispensed layers, dispenser 94 may be swept along the entire length of X-stage 96, i.e., beyond the boundaries of the layer being formed, to provide more time for the just-dispensed layer to solidify before the next layer is dispensed.

As an additional alternative for increasing the cooling of just-dispensed layers, a building material may be used which has a relatively low latent heat. Another alternative is to use a building material which has increased thermal conductivity. Such a material may emit internal heat more quickly thereby enabling it to cool and solidify more quickly. This characteristic may be incorporated into the building material in various ways.

For example, the building material may be filled with small quantities of a black-body radiator such as carbon black or graphite. Alternatively, the filler material may comprise a substance which selectively radiates at frequencies where the surrounding building material is transparent.

Such a filler material may be mixed in with the flowable building material in reservoir 70. To this end, the salting material may be fed into reservoir 70 by a feeder line (not shown) extending from a salting material container (not shown) positioned within enclosure 250. Alternatively, the salting material may be included within bottle 66 and then mixed with the building material as the building material is melted.

Another alternative involves using two different building materials, one having a high thermal conductivity. In this alternative, portions of a layer may be formed of the higher thermal conductivity material thereby allowing the layer as a whole to cool more quickly. To this end, it appears preferable to form the layer boundaries of the more highly conductive material because it may cool faster thereby providing strength to the rest of the layer and support for the subsequent layer.

The dispensing of building material from a dispenser such as ink jet print head 102 as shown in FIG. 11 is now further described. As shown in FIG. 11, orifice plate 158 may be mounted generally perpendicular to the sweeping direction along X-stage 96. Alternatively, orifice plate may be mounted at an angle thereto as described in concurrently-filed and continued U.S. Ser. No. 09/252,512, previously incorporated by reference herein.

Figure 13:
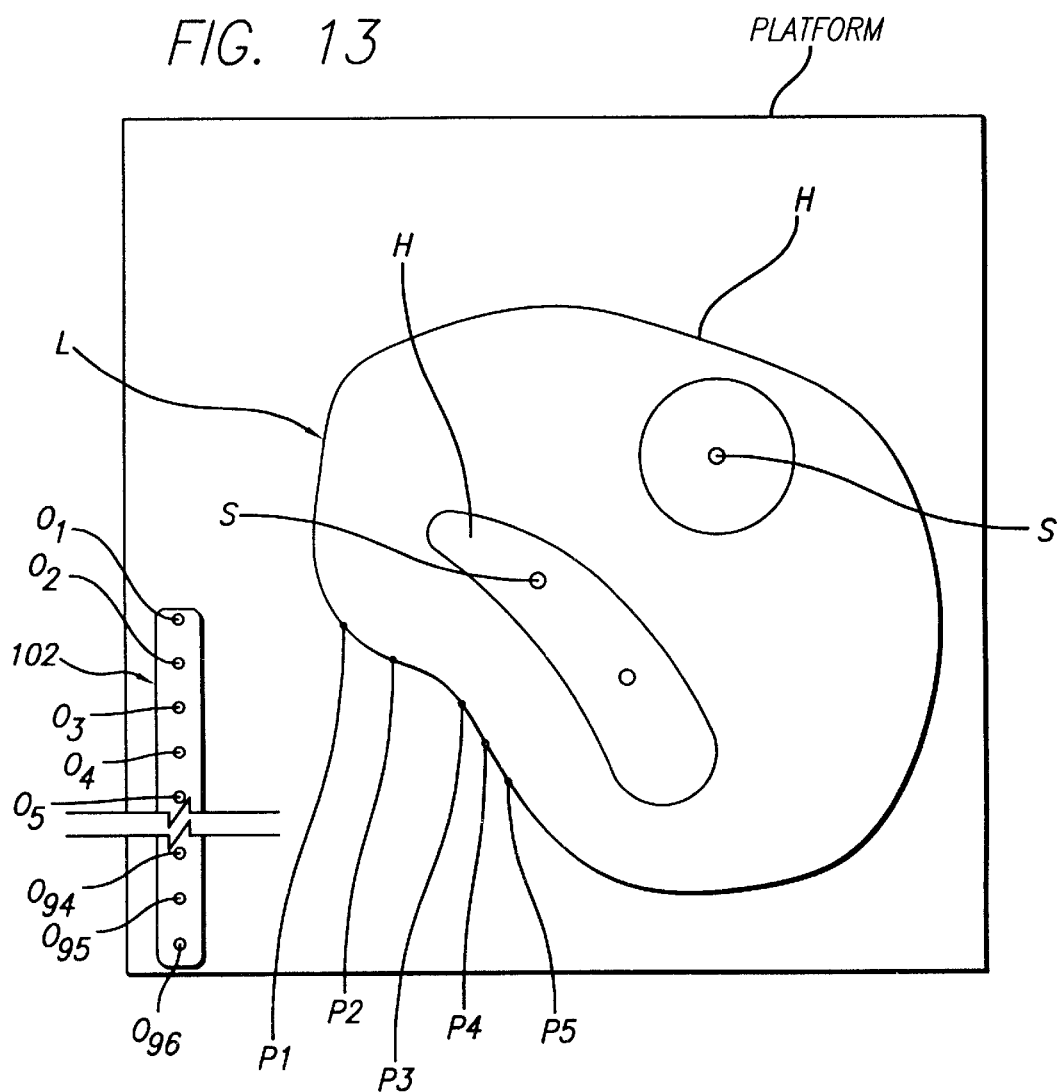
FIG. 13 shows an orifice plate with regard to a compressed bit map representation of a layer to be dispensed.

As mentioned above, the original CAD file describing the object to be formed is converted to an .STL file and then converted into an .RLE file by workstation 20. The .RLE file is essentially a compressed bit map where the area over platform 92 is represented by a grid of pixels, as shown in FIG. 13 with layer L superimposed thereon, each pixel representing a discrete point at which material may or may not be dispensed. As print head 102 sweeps across the pixels which comprises the area over platform 92, control computer 26 provides signals which command each orifice 156 to either fire one or more times, or not fire for each pixel.

With reference to FIG. 13, dispenser 102 is shown (with a break in the middle) at the beginning of a first sweep over platform 92 along X-stage 96. As print head 102 passes over the pixels in the lower left hand corner of platform 92, they will be commanded not to fire because the area comprising layer L has not yet been reached.

As print head 102 proceeds further however, it first encounters layer L by the area represented by pixel $P_1$. At this point, the ink jet associated with orifice $O_1$ will be commanded to fire thereby dispensing material at that location. At this time however, the other orifices $O_{2-96}$ do not fire because they have not yet encountered a pixel within the boundaries of layer L. As print head 102 travels further along, material continues to be dispensed from orifice $O_1$ and then from orifices $O_{2-96}$ as $P_2$ and subsequent pixels on the boundary of layer L are reached. When any of holes H are encountered however, the pertinent ink jets are commanded not to fire.

Because a distance separates each orifice 156 which may be about 0.0677 cm (26.67 mils), it can be seen that after a sweep of print head 102 is completed, "lines" of material will have been deposited with gaps therebetween. Accordingly, at the end of the first sweep, Y-stage 98 moves platform 92 incrementally so that for the next sweep along X-stage 96, orifices 156 will be aligned between the gaps. Y-stage 98 may be moved so that the next "lines" of deposited material are adjacent to the preceding lines dispensed, so that the next lines are located midway between the preceding lines or at some other Y-coordinate. In any event, it is preferred that the original gaps between the first-dispensed lines be adequately filled in by successive sweeps of print head 102 for a given layer.

It should be noted that for any type of dispenser 94, dispensing preferably occurs on a random basis. For example, with respect to ink jet print head 102, it is preferred that the same orifice 156 does not always dispense material at a given Y coordinate for successive layers. This is because if a particular orifice 156 clogs or otherwise stops working, it would repeatedly dispense an irregular line of material at that particular Y-coordinate resulting in an irregular object. This is also because different orifices 158 will typically dispense droplets of varying volumes.

It should also be noted that orifices 156 may be fired multiple times per pixel. Such "overprinting" serves to dispense more material per layer which may allow for reduced sweep speeds of dispenser 102 along X-stage, and also produces larger layer thicknesses. To this end, a four times overprinting, i.e., four drops of material fired per pixel, may result in a layer thickness of about 0.0038/cm to 0.00508 cm (1 ½ to 2 mils). To the extent that thinner layers are desired, planarizer 162 may be adjusted to remove any desired amount of excess.

As mentioned above, it is preferred that the overall building process be performed rapidly and various alternatives for reducing build time are now described. As a first alternative, the velocity at which dispenser 94 sweeps across platform 92 may be increased. Because this entails higher accelerations at either end of X-stage 96 however, increased inertial forces would result which could compromise building accuracy.

To avoid this, the mass of dispenser 94 may be reduced by positioning planarizer 162 in a stationary location above platform 92 instead of including it in dispenser 94. Here, after a layer or portion thereof is dispensed, platform 92 may be rotated or otherwise moved so that the just-dispensed material passes under and in contact with planarizer 162. Rotation, which may occur via a pivot (not shown) coupling platform 92 to Y-stage 98, is advantageous because lower inertial forces arise from the acceleration associated with the rotation.

Another alternative involves reducing or eliminating the amount of randomization performed during dispensing. For example, randomization may only occur every nth layer. This generally reduces the amount of time necessary to manipulate data and thus reduces build time. This alternative might be used where object resolution is not of paramount concern.

In another alternative with respect to a dispenser 94 comprising ink jet print head 102, orifice plate 158 may be angled relative to the X-direction as discussed above. This provides the benefit that the lines of dispensed material are closer together. Thus with objects that have a Y-dimension smaller than the length of orifice plate 158, fewer sweeps in the X-direction are necessary to achieve a solid layer, i.e., dispense material between the initial lines of dispensed material.

Another alternative with respect to any type of dispenser 94 involves determining the boundaries of the object on each layer and sweeping dispenser 94 over platform 92 only to the extent necessary to dispense each layer. Thus the time required to sweep from the layer boundary to the end of X-stage 96 and back to the boundary is eliminated. As discussed above, to achieve sufficient time for the layer to solidify or otherwise physically transform, cooling fans may be placed in proximity to the just-dispensed layer.

Referring to FIGS. 1a–d, 2 and 14, control module 200 is now further described. As mentioned above, control module 200 generally comprises the space within enclosure 250 that may house the various printed circuit boards and other control components. Control module 200 may be accessible via door 264 in enclosure 250 as shown in FIG. 15.

The various printed circuit boards and other components may be positioned in one or more areas 201 such as services area 201a, PC area 201b, motor driver area 201c and power supply area 201d. Each area 201 generally includes framing 202 that may comprise various walls, shelves, brackets and/or other devices for mounting the printed circuit boards and other components. One or more of frames 202 may slide along tracks (not shown) that may be mounted to base 42, backbone 50 or enclosure 250. This may provide that one or more portions of frame 202 may slide forward out of printer 40 when door 264 is opened to provide access for servicing and inspection. For the description below, frame 202 refers to any portion of the framing that may exist in control module 200.

Figure 14:
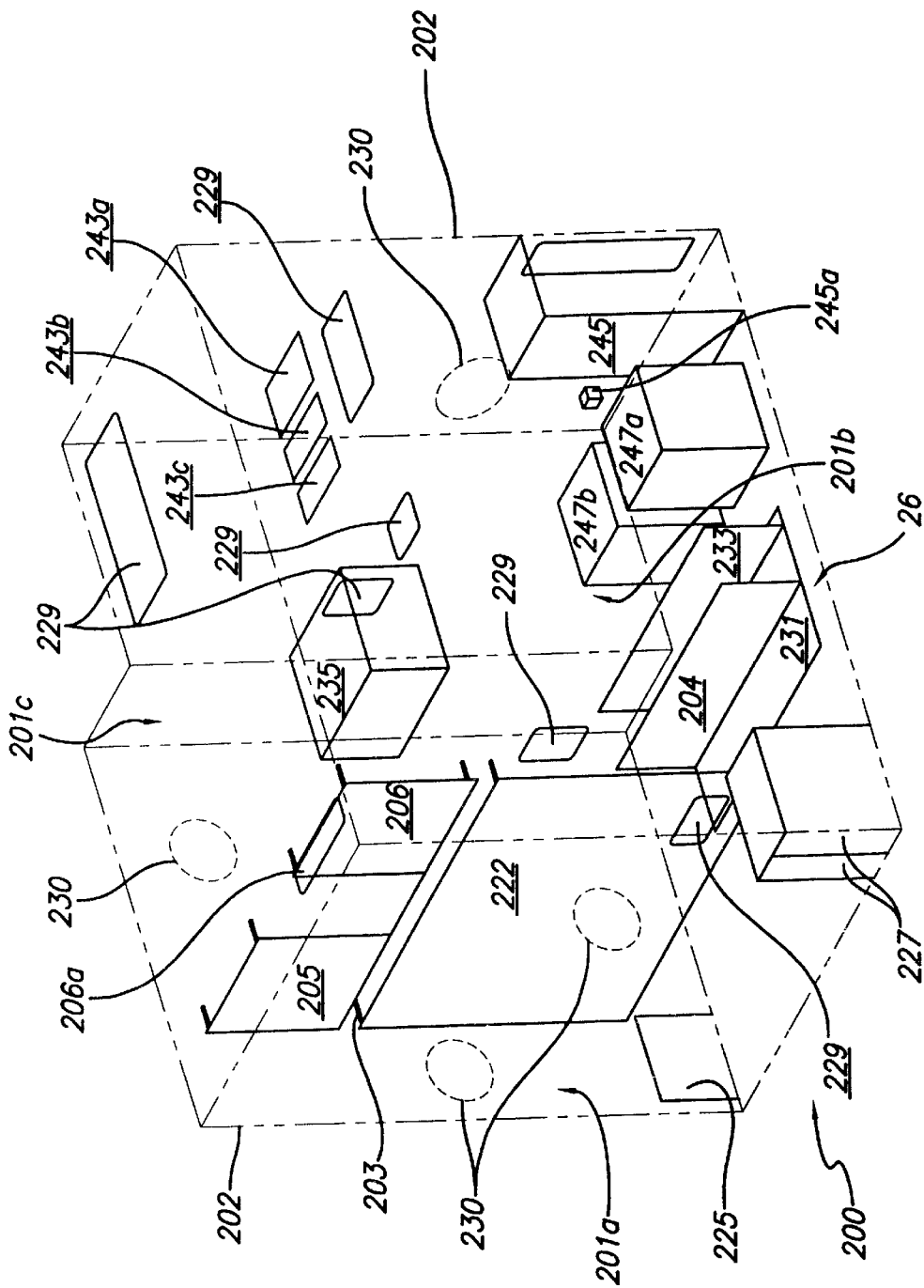
FIG. 14 shows a control module.

It should be noted that the printed circuit boards shown in FIG. 14 may not necessarily exactly correspond to the control components shown in FIG. 2. This is because FIG. 2 is more of a functional diagram rather than a schematic, i.e., the control components shown in FIG. 2 do not necessarily represent circuits or printed circuit boards. Thus components shown in FIG. 2 may actually be located on one or more of the boards shown in FIG. 14. Accordingly, while there is some correspondence between the reference numerals between those shown in FIG. 2 and 14, exact correspondence is not intended.

As shown in FIG. 14, services area 201 a may include services board 222 which may be mounted to frame 202 via mounting pins 203 or other attachment means. Relay module 205 and head driver board 206 may also be coupled to frame 202 via pins 203 in services area 201a. And where dispenser 94 comprises print head 102, print head board 206a may also be housed by services area 201a. Services area 201a may also house one or more printed circuit boards and control components, collectively referenced by numeral 225. These boards and/or other components may control the material feed, drain, nosewiper (described later) X-,Y- and Z-limits aspects of printer 40. Services area 201 a may also house hard and floppy disks 227 and associated disk drives 227a as shown. Other boards and/or components not shown in FIG. 14 may also be housed by services area 201a.

Frame 202 may also include cable cut-outs 229 to provide access for the various cable coupling the boards and other components of FIG. 14 between themselves and with other components of printer 40. Frame 202 may also include cooling fans 230 to provide forced airflow to cool the boards and other components of control module 200. Cut-outs 229 and fans 230 may be located at positions other than those shown in FIG. 14. The boards and components of services area 201a are preferably mounted so that airflow may circulate therearound to reduce temperature. To this end, pins 203 may provide spaces between the boards and frame 202 for such circulation.

PC area 201b may include control computer 26 which may comprise a PC or other computer device, which may include PC motherboard 231 and which may be powered by PC power supply 235. DSP card 204 and ethernet card 233 may be housed in PC area 201b. Should a media other than ethernet be used to couple workstation 20 to printer 40, ethernet card 233 may be replaced be another suitable card. Cable cut-outs 229 and cooling fans 230 may also be included in frame 202 of PC area 201b. PC area 201b may include other boards and/or components in addition to those shown in FIG. 14.

Motor driver area 201c may include motor drivers 243a, b, c that control X-stage 96, Y-stage 98 and Z-stage 100 respectively, and that may be coupled to a shelf included in frame 202. X-rectifier 244a, Y-rectifier 244b and Z-rectifier 244c which may be coupled to X-, Y- and Z- encoder readers 122, 135 and 153 respectively, may also be housed on this shelf. Motor driver area 201c may also include one or more cable cut-outs 229 and cooling fans 230.

Power supply area 201d may include AC inlet box 245 which may receive the electricity to run printer 40 and relay this voltage to one or more power supplies which is represented by numeral 245a in FIG. 14. Certain power supplies may comprise a PC type switcher for 5 volts DC and 12 volts DC for powering small motors, pressure regulators, interlocks and other smaller components. Other power supplies may involve 36 volts DC for powering heaters, fire voltage generation for ink jets when dispenser 94 comprises print head 102 and stepper motors. Other power supplies may involve 170 volts DC for powering the X-, Y- andlor Z-stages.

Power supply area 201d may also include one more motor amplifiers 246 for amplifying the signal received from motor drivers 244. One or more transformers 247a, b may also be included to convert voltages and reduce power spikes. The voltage conversion provided by transformers 247 also allows printer 40 to be used in various countries around the world where varying voltages and currents are typically used. To this end, it is noted that input powers of 100 to 120 volts RMS (+/−10%) at 10 amps, and 200 to 240 volts RMS (+/−10%) at 5 amps may be used.

Referring to FIG. 1a, other components which may be included in printer 40 are now described. Printer 40 may include heater 272 which may be mounted to base 42. Heater 272 may serve as a source of heat for the individual heaters discussed above as well as a source of heat for other applications within printer 40. To this end, heater 272 may be attached to circulation tubes 274 which may transport heat to the various individual heaters. Transportation of such heat may be facilitated by blowers or fans (not shown) which may propel the heated air through circulation tubes 274. Other components may also be included in the space below Z-stage 100.

With reference to FIG. 15, enclosure 250 is now further described. Generally, it is preferred that enclosure 250 contains the entire system 10 and provides an aesthetically pleasing appearance for use in office environments. To this end, the height of enclosure 250 is preferably in line with other common types of office furniture and may be approximately 107 cm.

Enclosure 250 preferably includes building cover 256 which may generally enclose a portion of the area surrounding the object being built and which may include window 258 for viewing the building process as it occurs. Cover 256 may preferably be readily lifted for access to building module 90 after the object has been built. To this end, handle 260 may be provided for releasing and lifting cover 256 from its rest position (as shown in FIG. 15). Cover 256 may be slid along track 262 to an "open" position so that the operator has both hands free to access building module 90. Handle 260 preferably includes interlock (not shown) which serves to lock cover 256 during the building process and as an emergency shut-off switch should cover 256 be nevertheless opened during the building process. Such shut-off option is desirable as the just-dispensed material it hot. A light may also be housed within cover 256 so that the building process may be viewed more easily.

As discussed above, enclosure 250 preferably includes a plurality of doors to access various modules and components of printer 40. Doors 252, 253 and 255 may be opened to access various portions of material handling module 60. For aesthetic and/or safety purposes, doors 252, 253 and 255 may themselves be covered by an exterior door (not shown). Door 263 may be opened to access that portion of building module under platform 92 as well as to access various components that may be located in this area. Door 264 may be opened to access the various PCBs and other components associated with control module 200.

Enclosure 250 is also preferably modular itself in that it may comprise top portion 265 which may be removed from bottom portion 266 should additional access be required. Bottom portion 266 may include control panel 267 that may be used to input building commands and/or display various building information. Control panel 267 is further described below. Enclosure 250 preferably attaches to base 42 and backbone 50 at various locations to ensure a secure fit thereto. Enclosure preferably comprises material which is rigid but also lightweight.

Enclosure 250 also preferably serves to contain noise arising from the building process and to this end, insulating material may be fastened to the interior of enclosure 250 to provide increased noise reduction. It is preferred that with all enclosure doors closed, the noise generated by system 10 is less than 50 decibels. Enclosure 250 may also serve to contain any vapors associated with the building materials.

Figure 17:
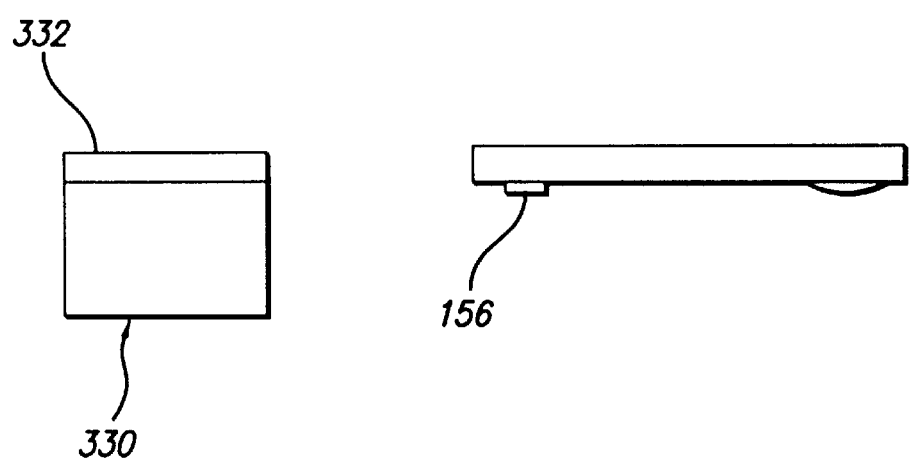
FIG. 17 shows a nosewiper.

As shown in FIG. 17, printer 40 may include nosewiper 330 which may serve to avoid clogging of orifices 156 where dispenser 94 comprises print head 102, by cleaning orifices 156 after they have just dispensed material. Nosewiper 330 may be mounted in building module 90 so that the top of film 332 is located on a plane which is approximately on the same plane as the bottom of orifices 156. Film 332 provides friction to an object moving across and in contact with it. Accordingly, when dispenser 102 completes its travel along X-stage 96, orifices 156 come into contact with film 332 and the friction therebetween preferably removes any material which may have remained in orifices 156 from the last dispensing sweep.

Accordingly, nosewiper 330 may serve to remove and retain excess material emitted from orifices 156 during purging. In an alternative embodiment nosewiper 330 may be used to clean the orifices 156 between sweeps of dispenser 102. Preferably, nosewiper 330 is located such that cylinder 164 of planarizer 162 does not contact film 332 when dispenser 102 reaches its end of travel along X-stage 96. It is also preferred that film 332 may be replaced or advanced periodically so that any build-up of material thereon will not be transferred to orifices 156, and that film 332 be positioned so as not to unduly hinder the motion of print head 102 along X-stage 96. Services board 222 may be used to control the advancing of film 332 of nosewiper 330.

Referring to FIG. 16, control panel 267 is now further described. As mentioned above, it is preferred that once the CAD or other object description has been entered into printer 40, that it be relatively easy for the operator to build objects. To this end control panel 267 may provide the following features.

Power button 275 may be used to turn printer on and off. When printer 40 is first turned on, the interlocks which may lock the various doors and cover 256 of enclosure 250 may be set to a default mode of being unlocked. For safety reasons however, when printer 40 is undergoing a test run or is building an object, it is preferred that the interlocks be in a locked mode. In the event of a power failure, the doors and cover 256 may remain locked until power is restored.

Control panel 267 may include the following graphic displays and buttons. Build display 277 may indicate the elapsed time since the start of an object building process, as well as the total time necessary to complete building the object. As shown in FIG. 16, this information may be displayed in the form of a plurality of indicators 277a such that when all indicators 277a are lit, the object is complete, while if half the indicators 277a are lit, the object is halfway completed. This advantageously allows the operator to know how far along the building process is by a quick glance.

The elapsed building time and total build time may also be displayed in numerical form as shown. Information reflecting total build time may be extrapolated from the .STL file describing the object, and a timer may provide information regarding elapsed building time, which information may be received by control panel 267 and then displayed.

In similar fashion, material display 279 may graphically and numerically show how much material remains in reservoir 70 of material handling module 60. The number of indicators 279a that are lit may graphically show how much material remains wherein when all indicators 279a are lit, reservoir 70 is full and when all indicators 279a are dark, reservoir 70 is empty. Information reflecting the level of material remaining in reservoir 70 may be provided by optical sensor 63a as shown in FIG. 7. Again, it is preferred that emergency material level sensor 82 would shut off printer 70 before all indicators 279a are dark. The amount of remaining material may also be displayed numerically as shown in FIG. 16. The amount of material in waste reservoir 86 may be similarly displayed.

Status display 281 may provide various messages regarding the mode of printer 40. Sample messages may include the following: WARMING UP, STANDBY, RUNNING TEST PRINT, TEST COMPLETED, WAITING NEXT JOB, BUILDING, BUILD PAUSED, REMOVE PART(S), ERROR ENCOUNTERED, SHUTTING DOWN AND SHUT DOWN. Other messages may also be provided. To provide such messages, the various printed circuit boards and other control components may be adapted to provide appropriate signals to control panel 267 when the various modes are in effect.

Message display 283 may provide additional messages indicating other conditions associated with printer 40 or requesting the operator to input information by pushing other buttons or interacting with some other component of printer 40. A sample message may be: ONLN, RPT, TEST, SDOWN? which essentially asks the operator whether printer 40 is to be online, whether the build should be repeated, or whether a test run or shutdown is desired. Other messages may include the identification of the job currently building, ADD MATERIAL, EMPTY WASTE, PLATFORM MISSING, DOOR NOT CLOSED, CHECK & REMOVE TEST PART, CONTINUE OR ABORT, CONFIRM CLEAR OR CANCEL, CONFIRM PAUSE OR CANCEL, CONFIRM ABORT OR CANCEL, CONFIRM SHUTDOWN OR CANCEL, OK TO POWER OFF or ERROR in which the type of error would be indicated. Other messages may also be provided.

To provide such messages, the various printed circuit boards and other control components as well as other components may provide signals to control panel 267. Also, the interlocks on the doors, material level sensors 80, 82 or other components may also be adapted to provide appropriate signals to control panel 267 when the various conditions are in effect. Various of the above messages are discussed more below.

Control panel 267 may also include modeler buttons 285 and build buttons 287. A light 288a or b may be located at the end of each row of buttons 285, 287 respectively which shows whether printer 40 is in the build or modeler modes and thus which row of buttons are active at a given point in time. The function of these buttons are described in more detail below.

When printer 40 is turned on, control computer 26 boots, control panel 267 energizes and status display 281 shows WARMING UP. At this point, the various heaters may warm up to standby levels. Also at this time, message display 283 shows CONFIRM CLEAR OR CANCEL. If the operator pushes the confirm button 289, message display 279 shows TEST and printer 40 may automatically go into a test mode wherein the various heaters ready printer 40 for building and a test build is begun. If the operator pushes the cancel button 290, status display 281 shows w SHUTDOWN, the heaters turn off and message display 283 shows OK TO POWER OFF. If the operator fails to respond, printer 40 sits in standby mode until a response is given.

Modeler buttons 285 may include online 285a, repeat job 285b, test 285c and shutdown 285d which all reflect different modes of printer 40. If any of the online, repeat job or test buttons are pushed, printer 40 will first check that platform 92 is present and building cover 256 is closed. If these conditions are not met, an ERROR message will be displayed. Message display 283 will then prompt for confirmation that the build area over platform 92 is clear. Upon confirmation, printer 40 will move temperatures to ready levels, initialize servos, lock building cover 256, and extinguish modeler light 288a and activate build light 288b to indicate that printer 40 is in the build mode. Printer 40 then assumes the selected mode.

When the test button 285c is pushed, printer 40 begins a test run such as a test print when dispenser 94 comprises a print head 102. This includes a purge, i.e., dispensing of material on one side of platform 92, followed by a nosewipe and concludes with some form of test print. At this time, status display 281 shows RUNNING TEST PRINT.

When the repeat job button 285b is pushed, status display 281 shows BUILDING and message display 283 shows the identification of the building job. Printer 40 starts building the last job contained in control computer 26, e.g., the last job contained on floppy disk 227 where control computer 26 comprises a PC.

When the online button 285a is pushed, status display 281 shows AWAITING NEXT JOB and message display 283 shows the identification of the building job. At this point, printer 40 is available for a network request and the build progress on build display 277 is shown. Upon completion of any of the three above modes, i.e., upon the completion of a test print or building job, the build indicator light 288b is extinguished and building cover 256 is unlocked.

More specifically, upon completion of a test print, status display 281 shows TEST COMPLETED and message display 283 shows CHECK & REMOVE TEST. At this time, it is preferred that building cover 256 and platform 92 be cycled, i.e., cover 256 be open and closed and platform 92 be replaced, before proceeding. When this has occurred, modeler light 288a illuminates and message display 283 shows ONLINE, REPEAT JOB, TEST or SHUTDOWN?

Upon completion of a build (or abort as discussed below), status display 281 shows REMOVE PART(S) and message display 283 shows the identification of the job completed. It is again preferred that the cover 256 and platform 92 be cycled before proceeding. When this has occurred, modeler light 288a illuminates and message display 283 shows ONLINE, REPEAT JOB, TEST or SHUTDOWN?

Commands that the operator may input while an object is being built are now discussed with respect to pause button 287a, continue button 287b and abort button 287c. During a build, or when the operator is waiting for a build in the WAITING NEXT JOB status, the operator may PAUSE or ABORT the building process by pushing buttons 287a, c respectively. After pushing pause button 287a, the operator may be prompted for CONFIRM PAUSE OR CANCEL by pushing one of buttons 289 or 290 before printer 40 actually pauses the building process. If confirmed, printer 40 may stop building, dispenser 94 may be moved to a "store" position and building cover 256 may be unlocked. At this point, status display 281 may show BUILD PAUSED, message display 283 may show CONTINUE OR ABORT? and build light 288b may be illuminated.

If aborted by pushing abort button 287c, message display 283 may show CONFIRM ABORT OR CANCEL before printer 40 aborts. The operator may confirm or cancel via buttons 289 or 290 and if confirmed, modeler light 288a may illuminate and message display 281 may show ONLINE, REPEAT, TEST, SDOWN? If continue button 287b is instead pushed, printer 40 will check for the presence of platform 92 and that building cover 256 is closed. If these conditions are not met, message area 283 may display a suitable message, and when they are met, building may continue.

If the operator desires to exit from the building mode to, for example, shutdown printer 40, perform a test print or repeat the last job while printer 40 is online, the operator may first abort via button 287c to exit the building mode. At this point, printer 40 will be in the modeler mode, any of buttons 285 may be pushed and modeler light 288a may be illuminated.

Confirm and cancel buttons 289, 290 are now further described. When any of the ONLINE, REPEAT or TEST messages are displayed, confirm button 289 may be pushed to confirm that the building volume is empty, i.e., that there is not already an object on platform 92. When any of the PAUSE, ABORT or SHUTDOWN messages are displayed, confirm button 289 may be pushed to confirm that any of these actions should take place. When any of the above messages are displayed, confirm button 289 may also be illuminated so that it is highlighted to the operator.

Cancel button 290 button may be used whenever the operator desires to undo the keypress that resulted in the confirm/cancel prompt. With the exception of starting up printer 40, if neither confirm nor cancel buttons 289, 290 are pressed after the operator's previous input, printer 40 may continue with its current activity and message display 283 may revert to the prior message after 30 seconds or some other time has elapsed.

Diagnostic button 291 may generally display all parameters of printer 40 to the operator and typically may not allow any status or mode of printer 40 to be changed. Should servicing be necessary, diagnostic button 291 may be used to help ascertain any of the various conditions of printer 40. It is preferred that diagnostic button 291 may be pushed at any time that printer 40 is not prompting the operator for an input.

Message scroll buttons 292 may be used so that messages that are longer than the number of characters available on message display 283 may be viewed. To this end, such messages may end with a ">" so that the operator knows that the message is longer than what is being displayed. It is preferred that message scroll keys 292 may be pushed at any time printer 40 is not prompting the operator for an input. It is also preferred that the message being displayed will revert to being left-justified some amount of time after scrolling buttons 292 have been pushed. Message scroll buttons 292 may also be used to fully display the building parameters during diagnostic review.

Shutting down printer 40 is now described. When message display 283 shows ONLINE, REPEAT, TEST or SHUTDOWN?, pressing shutdown button 285d may result in the message CONFIRM SHUTDOWN being shown with confirm button 289 being illuminated. Upon confirmation, the shutdown procedure may begin and message display 283 may show SHUTTING DOWN. When the shut down procedure is complete, status display 281 may show SHUTDOWN and message display 283 may show OK TO POWER OFF indicating that the main power switch may be turned off.

The standby mode mentioned above may occur when printer 40 has been inactive for some amount of time or when an error occurs. When in standby mode, status display 281 may show STANDBY and the various heaters may reduce their temperature to conserve energy. If an error occurs, message display 283 may show ERROR followed by a description of the error. Should the error message be long, scroll buttons 292 may be used.

Depending on the severity of the error, printer 40 may be put into standby mode wherein STANDBY may be indicated by status display 281, or printer 40 may put into shutdown mode wherein status display 281 may first show SHUTTING DOWN followed by SHUTDOWN. When the error is corrected, printer 40 may assume the standby mode and the various heaters may be heated to their standby mode temperature. At this time, message display 283 may show ONLINE, REPEAT, TEST, SHUTDOWN?

Referring now to FIGS. 18–21, alternatives to various aspects of system 10 are now described. As a first alternative, motion of dispenser 94 along X-stage 96 may be powered by magnetic linear track 340 as shown in FIG. 18. As shown, plate 342 and bracket 344 may serve to couple dispenser 94 to X-stage 96. Track 340 may comprise oppositely facing magnetic rails 346 and magnet 348. Coil 350 is movably mounted between magnetic tracks 346 and as a magnetic field is applied from magnet 348 along tracks 346, coil 350 moves back and forth in response thereto. Coil springs 352 may be located at each end of track 340 to provide a cushion should dispenser 94 and plate 342 travel too far.

As another alternative aspect, The object may be built in a circular pattern. In this embodiment, platform 92 would be capable of being rotated. To this end, slide 128 of Y-stage 98 may include additional hardware (not shown) such as releasable clamps or the like which may be loosened to allow platform 92 to be rotatably adjusted thereon. Alternatively, rail mounts 123 used to mount Y-stage 98 to Z-stage 100 may have the capability of allowing rotation therebetween. Preferably, the Z-stage may be rotateable adjusted on a screw type mechanism. In this embodiment, the required motion of the printhead may be limited to one axis, either X or Y, thereby greatly simplifying some aspects of the build operation. The rotation of platform 92 may aid in the formation of complex objects and reduce build time.

Figure 19:
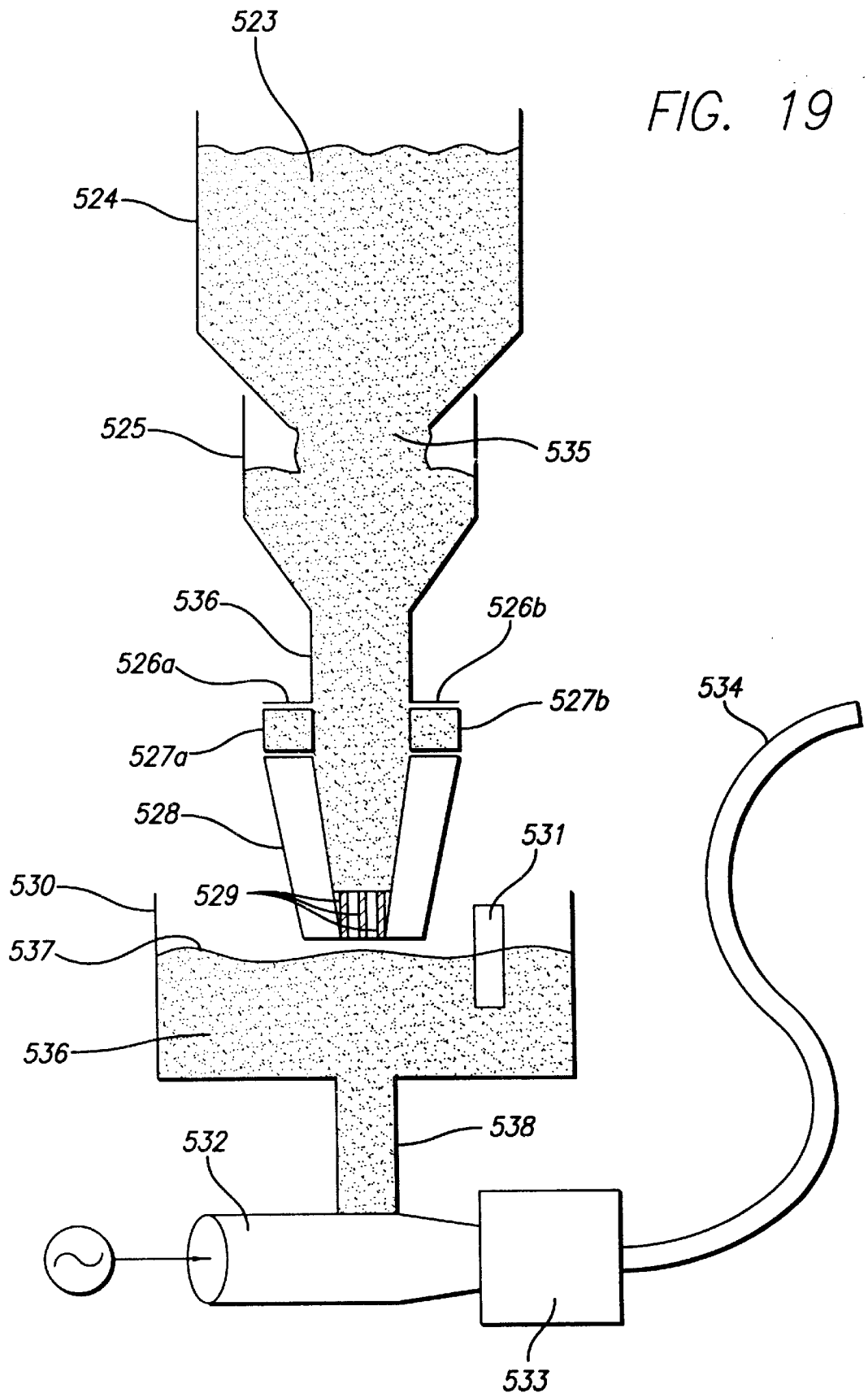
FIG. 19 shows an alternative material handling module.

An alternative material handling module 300 may reflect the embodiment shown in FIGS. 19–21. This embodiment, involves packaging material in the form of prills, a small "pinto-bean" or "raisonette" shaped and sized element. With reference to FIG. 19, the prills are loaded into drawer 524 which opens from the side of printer 40. Drawer 524 may be capable of being opened and closed and thus loaded with prills while the unit is in operation. The prills, upon being loaded into drawer 524, are identified with numeral 523 in the figure.

Also provided is hopper 525 into which the prills fall through opening 535 by the force of gravity. As shown, hopper 535 may also be configured with chute 536 which may be configured with flanges 526a and 526b. Flanges 526a and 526b may be in contact relationship with insulating spacers 527a and 527b which themselves may be in contact relationship with heater 528. Heater 528 is also equipped with holes 529 at its bottom, each of which has a diameter slightly smaller in size than the prills. Below the bottom of heater 528 is a heated reservoir 530 for containing molten material 536. Reservoir 530 may also be equipped with level detector 531 for detecting the level 537 of the molten material contained in reservoir 536.

As the prills fall into the hopper, some will be drawn into contact relationship with heater 528 by the force of gravity. Heater 528 is configured to melt those prills in contact relationship with it. The resultant material then flows through holes 529 situated at the bottom of heater 528, and flows into the reservoir 530 at which point it joins the body of molten material 536 already contained therein.

Heater 529 is controllably activated and deactivated by level detector 531 responsive to the level of molten material in reservoir 530. Heater 528 is normally in an off state, but when the level of molten material 536 falls too low as determined by the level detector, a signal is generated which activates the heater, turning it on, and causing it to melt more of the prills. At this point, the heater continues in this state until the level detector signals that the level of molten material in the reservoir has increased sufficiently. At this point, a signal is generated which deactivates the heater.

The level detector is also equipped with a "time-out" feature according to which a timer is activated at the same time that the level detector activates the heater to increase the level of molten material in the reservoir. In accordance with this feature, if the level of molten material has not been increased sufficiently by the time the timer has expired, indicating an abnormal condition such as lack of prills in the drawer 524, the entire unit may be shut down.

Also shown in FIG. 19 is piston pump 532 which is operatively coupled to the molten material in the reservoir through channel 538, filter 533, and heated tubing 534. The pump pumps molten material from the reservoir 530, passes it through filter 533, and then directs it to a reservoir on the print head through tubing 534. Tubing 534 is wound with a filament through which an electrical current is passed. The purpose is to heat the tubing, and thus keep the material in a molten state as it passes through the tubing on its way to the print head.

Another alternative embodiment of material handling module 60 is shown in FIG. 20, in which, compared to FIG. 19, like elements are referenced with like reference numerals. As shown, in this embodiment, material is packaged in solid form (either as a block or in the form of prills) inside bottles 540a and 540b. Advantageously, the bottles are disposable, made from a plastic material such as polypropylene or polyethylene, and are large enough to hold about 5.5 kg. of material. Preferably, more than one (and advantageously two) bay or docking station, identified with numerals 539a and 539b, are provided into which the bottles are fit as shown.

In operation, material will be dispensed from only one bottle at a time, with the other bottle acting as a backup to handle the case in which the process of building a part requires an unanticipated large amount of material to produce. As discussed later, the system is set up to allow the function of material dispensation to be transferred from one bottle to another in an uninterrupted manner.

Each docking station is equipped with a heater (not shown) which is coupled to and controllable by level detectors 550a and 550b responsive to the level 555 of molten material 556 contained in heated reservoir 551. The purpose of these heaters is to keep the material in the bottle which is designated to supply material to the part-building process in a molten state. The heater associated with the other bottle is advantageously not activated until this bottle is used to take over the dispensing function. In FIG. 20, for example, bottle 540a is being used to provide the material for the part-building process. The corresponding heater is thus activated to keep the material 533 contained therein in a molten state. Bottle 540b, in contrast, is intended to function as a back-up in case the material in bottle 540a is exhausted before the part-building process is complete. The corresponding heater is not activated; thus, the material contained therein, identified with numeral 554, is in solid form.

The bottles are each equipped with a handle, identified with numerals 541a and 541b, respectively, enabling a user to easily place and remove the bottles from the bays 539a and 539b. Each bay is also equipped with a solenoid locking pin, identified with numerals 543a and 543b, which, at selected times, are configured to operatively engage the handles of the bottles after the same have been placed in their respective bays. As will be discussed later, the locking pins function to lock the bottles in place while material is being dispensed therefrom, in order to prevent burns and the like by making the lower portions of the bottles inaccessible while they still contain molten material.

The bottles are also equipped with spring-loaded collars 544a and 544b. The spring-loaded collars function by progressively moving each bottle upwards out of the respective bays as the contents are being expended. The purpose is to provide a visual indication of the level of material still contained in each bottle.

The bottoms of the bottles are also equipped with hingeable flaps, identified with numbers 545a and 545b in FIG. 20. As shown, these flaps are situated at the bottom of the bottles, and are in a normally closed position. As illustrated in FIG. 21, they are formed by imprinting a semi-circular trough 55 in the bottom of the bottle. The flap is hingeable about areas 559a and 559b, which are molded into the bottom of the bottle. When the bottles are placed in their operative positions within bays 539a and 539b, the bottoms of the bottles make operative engagement with pins, identified with numerals 546a and 546b in FIG. 20, and are thereby pushed into an open position. These pins contact the bottom of the bottle at a series of points extending around the periphery of the semi-circular outline of the flap. These points are identified with numeral 557 in FIG. 21. The result is that the flap opens up into an open position, with the line extending between the two molded areas acting as a hinge, which line is identified with numeral 558 in FIG. 21. The flaps associated with the bottles 540a and 540b in FIG. 20, which flaps are identified with numerals 545a and 545b, are shown in their open positions.

The two bays are each equipped with tubular openings, identified with numerals 549a and 549b in FIG. 20, and are situated such that the openings extend into the interior of reservoir 551. When the bottles are in their operative positions in the bays, the bottles rest on and abut against seals, identified with numerals 547a and 547b, which function to seal the gaps between the inner surfaces of the bays and the outer surfaces of the bottles.

Advantageously, plugs 549a and 549b are provided in engagement relation with the openings at the bottom of tubular sections 549a and 549b. The plugs are coupled to and function in cooperative relationship with level detectors 550a and 550b as follows: As the level 555 of the molten material in the reservoir rises, detectors 550a and 550b, which are preferably buoyant in the material and are tapered towards the top as shown, automatically rise as well, thus plugging up the openings in the bottom of the tubular sections 549a and 549b. On the other hand, as the level 555 falls due to usage of the material in the part building process, the plugs fall as well. Eventually, the plugs fall to the point that material can flow out of tubular openings 549a and 549b. Plug 548a, for example, has fallen to the point that an opening is created in the bottom of tubular opening 549a. Since the material in this bottle is in a molten state, such material will flow out of the opening until the level 555 has risen to the point that the plug 549a plugs the tubular opening 549a up again.

It should be appreciated, however, that plugs 548a and 548b, and level detectors 550a and 550b, are not necessary for proper operation of the system. That is because material will naturally flow from the designated container to engage the material contained in the reservoir, be drawn from the container as material from the reservoir is used in the part-building process, and thus maintain the level of material in the reservoir, in the absence of plugs and level detectors. With reference to FIG. 20, for example, material 553 will flow through opening 549a and engage material 556, in the absence of plug 549a and level detector 550a. As the level 555 falls as material is used in the part building process, material will automatically be drawn from bottle 540a to maintain the level 555 of material in the reservoir.

When a bottle is designated as the source of material for part building, the corresponding solenoid locking pin 543a or 543b, as the case may be, operatively engages the corresponding handle, either 541a or 541b, through slot 542a or 542b. In FIG. 20, since bottle 540a is designated as the source of building material, pin 543a has engaged handle 541a, thus locking the bottle in place. Bottle 540b, in contrast, is designated as a back-up. Thus, pin 543b has not engaged handle 541b.

Once engaged, the pin locks the respective bottle in place until the contents thereof have been dispensed, and a time period has passed to allow the bottle to cool down. At that time, the solenoid disengages the pin from the corresponding handle, thus releasing the bottle and allowing it to be replaced by a user. Again, the purpose is to prevent a user from getting burned. The solenoid pin associated with the other bottle then advantageously locks the same in place. Moreover, the heater associated with the other bottle is activated to put the contents thereof in a molten state.

Spring-loaded collars 544a and 544b function to raise the bottles in their respective bays progressively as the contents of the bottles are expended. The purpose is to provide a visual indication of the level of material in the respective bottles. Filters 558a and 558b are also provided in the openings 549a and 549b. They function to filter the material, and keep it in a clean state, as it is dispensed into the reservoir.

As another alternative aspect, backbone 50 may comprise a casing filled with polymer concrete. While such a construction is generally heavier than the cast aluminum described before, such increased weight may be preferred to dampen the increased inertial forces which would be created by the larger acceleration and decelerations of dispenser 94 if it is to be swept along X-stage 96 at higher velocities. To this end, backbone 50 comprising polymer concrete may adequately dampen the increased inertial forces caused by the greater acceleration and deceleration associated with higher dispenser 94 velocities such as about 140 cm/sec. Numerous additional variations and modifications of the present invention are possible in light of the above teachings. It is therefore to be understood that, within the scope of the appended claims, the invention may be practiced otherwise than as specifically described above.

What is claimed is:

1. An apparatus for forming a three-dimensional object from a material normally in a solid state but which is flowable when at or above a flowable temperature, comprising:

a material loading module mounted to the apparatus for receiving and rendering the material flowable;

a dispenser connected to the apparatus for selectively dispensing successive layers of the material to form the three-dimensional object, the dispenser being in flow communication with the material loading module;

a platform mounted on the apparatus which is substantially maintained below the flowable temperature and cooperative with the dispenser such that the successive layers are selectively dispensed thereon, wherein the material loading module includes a resupply receptacle for receiving a removable container of material, the material being in solid or partially solid phase, a heater positioned relative to and conected to the receptacle for heating material in the container received in the receptacle to a molten flowable state; the receptacle further having a fluid flow opening through which molten material flows from the container received in the receptacle to a reservoir in fluid flow communication with the fluid flow opening of the receptacle, the reservoir receiving molten material from the fluid flow opening; and a planarizer mounted to the apparatus for removing excess material from the successively dispensed layers, the planarized comprising a heated member and a device to remove material from the heated member by vaporizing material.

2. The apparatus of claim 1 further comprising a control workstation for interfacing with an operator, the control workstation being electrically coupled to the at least one control computer.

3. The apparatus of claim 1 further comprising:

an X-stage coupled to the dispenser for reciprocatingly sweeping the dispenser across the platform;

a Y-stage coupled to the platform for moving te platform transversely to the direction of sweeping; and a Z-stage coupled to the Y-stage for vertically moving the platform.

4. The apparatus of claim 1 wherein the dispenser further includes an ink jet print head.

5. The apparatus of claim 1 further comprising:

a wiper for collecting any unvaporized excess material from the planarizer;

a collection reservoir for collecting the excess material from the wiper, and a material feeder line extending from the collection reservoir to the material loading module.

6. The apparatus according to claim 1 wherein the platform is contained within a build environment.

7. The apparatus according to claim 6 wherein the build environment is maintained at a temperature of about 25° C.

8. An apparatus for forming a three-dimensional object from a material normally in a solid state but which may be rendered flowable when maintained above a flowable temperature, comprising:

a material loading module mounted to the apparatus for receiving and rendering the material flowable the material loading module including:

a resupply receptacle mounted to the apparatus for receiving a removable container of material;

a heater positioned in proximity to the receptacle for rendering the material flowable;

a reservoir functionally coupled to the receptacle for receiving material from the removable container and for containing flowable material; and a dispenser for selectively dispensing successive layers of material to form the three-dimensional object, the dispenser including:

an ink jet print head connected to the material feed line and including a plurality of orifices from which droplets of material are selectively dispensed;

a planarizer for removing excess material from e successively dispensed layers the planarizer comprising a heated member and a device to remove material from the member by vaporizing material;

a material feeder line coupling the reservoir to the dispenser; and a platform in a build environment which is substantially maintained below the material flowable temperature and on which the successive layers are selectively dispensed, the build environment being maintained at a temperatur of about 25° C.

9. The apparatus of claim 8 wherein the heated member is maintained above the flowable temperature and contacts the successively dispensed layers thereby renderng flowable at least any material above a desired working surface.

10. The apparatus of claim 9 wherein the member further comprises a rotating cylinder.

11. The apparatus of claim 9 wherein the member further comprises a blade.

12. The apparatus of claim 9 wherein the member is heated to a temperature sufficient to vaporize the at least any material above a desired working surface.

13. The apparatus of claim 12 wherein the member further comprises a wire.

14. The apparatus of claim 9 wherein the device comprises a vacuum.

* * * * *

UNITED STATES PATENT AND TRADEMARK OFFICE
CERTIFICATE OF CORRECTION

PATENT NO. : 6,305,769 B1
DATED : October 23, 2001
INVENTOR(S) : Thayer et al.

It is certified that error appears in the above-identified patent and that said Letters Patent is hereby corrected as shown below:

Column 17,
Line 27, "preferred wave causes a drop of material to be emitted from" should read
-- print head is a modified version of the 96 Jet Spectra Commercial Printhead, model no. HDS 96i, manufactured by Spectra, Inc. of Nashua, New Hampshire.

Generally, print head 102 receives flowable material from feeder line 72. Print head 102 then selectively emits droplets of the flowable material through a plurality of orifices 156 which are arranged in orifice plate 158 on the bottom of print head 102. This selective emission of droplets preferably occurs under computer control based on signals received from DSP 204 which signals were based on location signals from encoder reader 122 of X-stage 96.

To accommodate multiple building materials, print head 102 may include a plurality of ports (not shown) to receive multiple incoming feeder lines 72 that may supply different materials through different orifices 156. Alternatively, multiple print heads 102 may each be connected to individual feeder lines 72 wherein the various print heads may each be used to supply a different material. To accommodate the X-direction movement of print head(s) 102, feeder line(s) 72 preferably have sufficient length and resiliency to withstand repeated flexing as print head(s) 102 dispense material. After feeder line(s) 72 enter print head(s) 102 suitable individual feeder lines (not shown) emanate out to each individual orifice 156.

Orifice plate 158 may be mounted approximately perpendicular to the X-direction and may include 96 individual orifices 156 with a spacing of about 0.0677 cm, i.e., about 26.67 mils. Accordingly, the length of orifice plate 158 is about 6.553 cm. Orifice plate 158 may be located so that it protrudes slightly from the bottom of dispenser platform 154. Print head 102 is preferably capable of depositing droplets of material at resolutions of about 300 drops per inch (DPI) (118 drops/cm), 600 DPI (236 DPC) and 1,200 DPI (472 DPC) which provides for varying resolutions in building styles and varying building speeds.

Each orifice 156 may be equipped with a piezoelectric crystal which emits a pressure wave when an electric firing pulse is applied to the crystal. The pressure --.

Column 19,
Line 47, "preferable to avoid a boundary layer of print head is a" should read
-- preferable to avoid a boundary layer of --.
Lines 48-66, should be deleted.
Line 25, "described in application U.S." should read -- described in U.S. --.

UNITED STATES PATENT AND TRADEMARK OFFICE
CERTIFICATE OF CORRECTION

PATENT NO. : 6,305,769 B1
DATED : October 23, 2001
INVENTOR(S) : Thayer et al.

It is certified that error appears in the above-identified patent and that said Letters Patent is hereby corrected as shown below:

Column 20,
Lines 1-18, should be deleted.
Line 19, "pulse is applied to the crystal. The pressure material from" should read -- material from --.

Column 22,
Line 64, "concurrently-filed application U.S." should read -- U.S. --.

Column 23,
Line 15, "in concurrently-filed applications" should read -- in --.

Column 35,
Line 62, "sections 549a and 549b" should read -- 548a and 548b --.

Column 37,
Line 44, "moving te" should read -- moving the --.
Line 33, "planarized" should read -- planarizer --.

Signed and Sealed this

Twenty-third Day of April, 2002

Attest:

*Attesting Officer*

JAMES E. ROGAN
*Director of the United States Patent and Trademark Office*